(12) United States Patent
Seki et al.

(10) Patent No.: US 7,924,784 B2
(45) Date of Patent: Apr. 12, 2011

(54) FEEDBACK CONTROL METHOD AND APPARATUS IN CLOSED-LOOP TRANSMIT DIVERSITY

(75) Inventors: Hiroyuki Seki, Kawasaki (JP); Daisuke Jitsukawa, Kawasaki (JP); Yoshinori Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 881 days.

(21) Appl. No.: 10/872,314

(22) Filed: Jun. 17, 2004

(65) Prior Publication Data

US 2004/0233871 A1 Nov. 25, 2004

Related U.S. Application Data

(63) Continuation of application No. PCT/JP02/00300, filed on Jan. 18, 2002.

(51) Int. Cl.
*H04W 4/00* (2009.01)
*H04L 12/28* (2006.01)
*H04L 12/56* (2006.01)

(52) U.S. Cl. .................. 370/331; 370/332; 370/395.2; 370/395.3; 455/437; 455/440; 455/456.1; 455/562.1

(58) Field of Classification Search .................. 455/437, 455/440, 456, 562; 370/95.1, 95.3, 332, 370/331
See application file for complete search history.

(56) References Cited

U.S. PATENT DOCUMENTS

| | | | |
|---|---|---|---|
| 5,067,147 A | 11/1991 | Lee | |
| 5,243,598 A | 9/1993 | Lee | |
| 5,893,033 A | 4/1999 | Keskitalo et al. | |
| 6,141,555 A * | 10/2000 | Sato | 455/437 |
| 6,144,652 A * | 11/2000 | Avidor et al. | 370/336 |
| 6,564,057 B1 * | 5/2003 | Chun et al. | 455/437 |
| 6,571,097 B1 * | 5/2003 | Takai | 455/436 |
| 6,754,473 B1 | 6/2004 | Choi et al. | |
| 6,766,144 B2 * | 7/2004 | Kim et al. | 455/67.11 |
| 6,892,059 B1 | 5/2005 | Kim | |
| 6,985,466 B1 * | 1/2006 | Yun et al. | 370/335 |
| 7,693,106 B1 * | 4/2010 | Ishikawa et al. | 370/331 |
| 2004/0233871 A1 * | 11/2004 | Seki et al. | 370/331 |

FOREIGN PATENT DOCUMENTS

| | | |
|---|---|---|
| DE | 100 07 998 A1 | 9/2000 |
| EP | 0 932 319 A2 | 7/1999 |
| JP | 5-252100 | 9/1993 |
| JP | 9-238098 | 9/1997 |
| JP | 09-275582 A | 10/1997 |

(Continued)

OTHER PUBLICATIONS

U.S. Appl. No. 10/872,314.*

(Continued)

*Primary Examiner* — Hong Cho
*Assistant Examiner* — Lonnie Sweet
(74) *Attorney, Agent, or Firm* — Myers Wolin, LLC

(57) ABSTRACT

Disclosed is a feedback control method in closed-loop transmit diversity in which feedback information representing amounts of amplitude and phase control is transmitted from a mobile station to a radio base station. The mobile station receives downlink pilot signals, which are transmitted by a handover-destination base station, during handover control, calculates feedback information, which represents amounts of amplitude and phase and phase control transmitted to the handover-destination base station, beforehand based upon the pilot signals received, and transmits the feedback information to the handover-destination base station before completion of base-station changeover by handover.

11 Claims, 18 Drawing Sheets

FOREIGN PATENT DOCUMENTS

| | | |
|---|---|---|
| JP | 2000-244386 | 9/2000 |
| JP | 2001-169325 | 6/2001 |
| KR | 2001-0036597 A | 5/2001 |
| WO | WO 91/07019 | 5/1991 |

OTHER PUBLICATIONS

Translation of International Preliminary Examination Report dated Apr. 1, 2003.

Office Action issued by Japanese Patent Office dated Jul. 24, 2007 for Patent Application No. 2003-563246.

3GPP TS 25.214 V4.3.0 (Dec. 2000); Technical Specification; 3rd Generation Partnership Project; Technical Specification Group Radio Access Network; Physical layer procedures (FDD) (Release 4); pp. 1-53.

Office Action issued by Japanese Patent Office dated Jun. 3, 2008 for corresponding JP Patent Application No. 2003-563246.

Supplemental European Search Report issued for corresponding European Patent Application No. 02 71 5792, mailed Oct. 28, 2010.

* cited by examiner

FEEDBACK CONTROL METHOD AND APPARATUS IN CLOSED-LOOP TRANSMIT DIVERSITY

CROSS-REFERENCE TO RELATED APPLICATION

The present application is a continuation of International Application No. PCT/JP02/00300 which was filed on Jan. 18, 2002.

BACKGROUND OF THE INVENTION

This invention relates to a feedback control method and apparatus in a closed-loop transmit diversity system. More particularly, the invention relates to a feedback control method and apparatus in which a delay in transmit diversity that arises immediately after handover is avoided by calculating and feeding back antenna weight with respect to a handover-destination base station in advance of base-station changeover by handover.

In a closed-loop transmit diversity scheme, a radio base station of a cellular mobile communication system is provided with a plurality an antenna elements. A base station ① subjects the same transmit data signal to different amplitude and phase control based upon feedback information that is sent from a mobile station, and ② multiplexes pilot signals onto the transmit data that has undergone the amplitude and phase control and transmits the resultant signals using different antennas. ③ The mobile-station side again decides the feedback information (amounts of amplitude and phase control) using downlink pilot signals, multiplexes the information onto an uplink channel signal and transmits the resultant signal to the side of the base station. The above-described operation is thenceforth repeated.

With closed-loop transmit diversity in W-CDMA, which is a third-generation mobile communication system, a scheme that uses two transmit antennas is employed. FIG. 13 is a diagram illustrating the system configuration in a case where two transmit antennas are used. Mutually orthogonal pilot patterns $P_1$, $P_2$ are generated in a pilot signal generator 11, the signals are incorporated into transmit data in combiners $CB_1$, $CB_2$ and transmitted from transmit antennas 10-1, 10-2, respectively. A channel estimation unit (not shown) on the receiving side of a mobile station correlates the receive pilots signals and corresponding known pilot patterns, whereby it is possible to estimate channel-impulse response vectors $\underline{h}_1$, $\underline{h}_2$ from the transmit antennas 10-1, 10-2 of the base station to a receive antenna 12 at the mobile station.

A control-amount calculation unit 13 uses these channel estimation values to calculate an amplitude and phase control vector (weight vector) $\underline{w}=[w_1,w_2]^T$ of the transmit antennas 10-1, 10-2 of the base station, which vector maximizes power P indicated by Equation (1) below. The vector is quantized, multiplexed onto the uplink channel signal as feedback information and transmitted to the side of the base station. It should be noted that it is unnecessary to transmit both the values $w_1$, $w_2$, it being sufficient to transmit only the value $w_2$ in a case where $w_1$ is obtained as $w_1=1$.

$$P=\underline{w}^H H^H H \underline{w} \quad (1)$$

$$H=[\underline{h}_1,\underline{h}_2] \quad (2)$$

Here $\underline{h}_1$, $\underline{h}_2$ represent the channel-impulse response vectors from the transmit antennas 10-1 and 10-2, respectively. Further, the suffix H at the upper right of $H^H$ and $\underline{w}^H$ indicates taking the Hermitian conjugate of H and w. The impulse response vector $\underline{h}_i$ is expressed by the following equation, where L represents the length of the impulse response:

$$\underline{h}_i=[h_{i1},h_{i2},\ldots,h_{iL}]^T \quad (3)$$

When a soft handover is performed, the control vector w that maximizes the following equation instead of Equation (1) is calculated:

$$P=\underline{w}^H(H_1^H H_1+H_2^H H_2+\ldots)\underline{w} \quad (4)$$

where $H_k$ is the channel impulse response of the signal from a kth base station.

The mobile station calculates the weighting coefficients (weight vector) in the control-amount calculation unit 13, multiplexes the weighting coefficient onto the uplink transmit data as feedback information using a multiplexer 18 and transmits the information to the base station from a transmit antenna 14. At the base station the feedback information from the mobile station is received by a receive antenna 15, the weighting coefficients $w_1$, $w_2$, which are the control quantities, are extracted by a feedback information extraction unit 16, and an amplitude and phase controller 17 multiplies the downlink transmit data by the weighting coefficients $w_1$, $w_2$ using multipliers $MP_1$, $MP_2$ and controls the amplitude and phase of the signals transmitted from the transmit antennas 10-1, 10-2. As a result, the mobile station is capable of receiving the signals transmitted from the two diversity transmit antennas 10-1, 10-2 in an efficient manner.

Two methods are stipulated in W-CDMA, namely a mode 1, in which the weighting coefficient $w_2$ is quantized to one bit, and a mode 2, in which the weighting coefficient $w_2$ is quantized to four bits. In mode 1, 1-bit feedback information is transmitted every slot to perform control and therefore control speed is high. Accurate control cannot be achieved, however, because quantization is coarse. In mode 2, on the other hand, control is performed by 4-bit information and, hence, highly accurate can be achieved. However, feedback information is transmitted one bit at a time in each frame and one word of feedback information is transmitted by four slots. If the fading frequency is high, therefore, follow-up will not be possible and a degraded characteristic will result. Thus, in a case where the uplink channel signal transmission rate for transmitting the feedback information is limited, there is a trade-off relationship between control precision and fading-follow-up speed.

FIG. 14 is a diagram showing the structure of an uplink frame standardized by the $3^{rd}$ Generation Partnership Project (referred to as "3GPP" below). A DPDCH data channel (Dedicated Physical Data Channel) on which only transmit data is transmitted and a DPCCH control channel (Dedicated Physical Control Channel) on which a pilot and control data such as feedback information are multiplexed and transmitted are multiplexed on real and imaginary axes by orthogonal codes. More specifically, one frame has a duration of 10 ms and is composed of 15 slots (slot #0 to slot #14). The DPDCH data channel is mapped to an orthogonal I channel of QPSK modulation and the DPCCH control channel is mapped to an orthogonal Q channel of QPSK modulation. Each slot of the DPDCH data channel (I channel) consists of n bits, and n varies in accordance with the symbol rate. Data of one or more transport channels can be multiplexed and transmitted, up to a maximum of six channels, on the DPDCH data channel. Each slot of the DPCCH control channel (Q channel) that transmits the control data consists of ten bits, has a symbol rate of a constant 15 ksps and transmits a pilot PILOT, transmission power control data TPC, a transport format combination indicator TFCI and feedback information FBI. The PILOT is utilized on the receiving side to perform channel estimation (estimation of propagation path characteristics) and when measuring SIR. The TFCI transmits the symbol speed of data, the number of bits per frame and the number of bits increased by repetition, etc. The FBI transmits the above-mentioned feedback information (weighting coefficients; weight vectors) for controlling the transmit diversity at the base station.

According to the specifications of Release 99 of W-CDMA, no consideration is given to a case where the number of transmit antennas is greater than two in order to avoid a decline in the transmission efficiency of the uplink channel owing to transmission of feedback information. However, if an increase in feedback information or a decline in update speed is allowed, expansion to three or more antennas is possible.

FIG. 15 is a diagram illustrating an example of an arrangement for a case where the number of transmit antennas is four. Structural elements in FIG. 15 similar to those shown in FIG. 13 are designated by like reference numerals and are not described again. In a case where there are N-number of transmit antennas (there are four transmit antennas 10-1 to 10-4 in the example of FIG. 15), N-number of mutually orthogonal pilot signals $P_1(t), P_2(t), \ldots P_N(t)$ are transmitted by a radio base station using respective ones of different transmit antennas. The pilot signals are related as follows:

$$\int P_i(t) P_j(t) dt = 0 \quad (i \neq j) \tag{5}$$

Each pilot signal sustains its own amplitude and phase fluctuation ascribable to fading, and the combined signals are input to the receive antenna 12 of the mobile station. The channel estimation unit (not shown) in the receiver of the mobile station obtains the correlation between the receive pilot signals affected by fading and the known pilot signals $P_1(t), P_2(t), \ldots P_N(t)$, whereby it is possible to estimate channel-impulse response vectors $\underline{h}_1, \underline{h}_2, \ldots \underline{h}_N$ of each of the pilot signals.

The control-amount calculation unit 13 uses these channel-impulse response vectors to calculate an amplitude and phase control vector (weight vector) $w = [w_1, w_2, \ldots w_N]^T$ of the transmit antennas 10-1 to 10-4 of the base station, which vector maximizes power P indicated by Equation (6) below. The vector is quantized, multiplexed onto the uplink channel signal as feedback information and transmitted to the side of the base station by the multiplexer 18.

$$P = \underline{w}^H H^H H \underline{w} \tag{6}$$

$$H = [\underline{h}_1, \underline{h}_2, \ldots \underline{h}_N] \tag{7}$$

In the case of FIG. 15 also it will suffice to transmit the values of $w_2, w_3, \ldots w_N$ in an instance where $w_1$ is obtained as $w_1 = 1$. In actuality, multiplier $MP_1$ for multiplying the downlink transmit data signal by the weight vector $w_1$ is omitted in FIG. 15.

FIG. 16 is a diagram illustrating an example of the structural detail of the mobile station. It is assumed in FIG. 16 that the base station has four transmit antennas. First, a downlink data signal from the base station is received by the receive antenna 12 and sent to a data channel despreader 20 and pilot channel despreader 22. The data channel is despread by the data channel despreader 20 and the pilot channel by the pilot channel despreader 22. The despread pilot signal, which is the result of processing by the pilot channel despreader 22, is input to channel estimation units 23-1 to 23-4.

The channel estimation units 23-1 to 23-4 compare receive pilot signals $P_1'$ to $P_4'$ and the known pilot signals $P_1$ to $P_4$ in order to obtain the channel estimation values from the transmit antennas 10-1 to 10-4 of the base station to the receive antenna 12. The channel estimation units 23-1 to 23-4 obtain channel impulse responses $\underline{h}_1$ to $\underline{h}_4$, which indicate the state of amplitude and phase modulation ascribable to propagation of the receive pilot signals and input these responses to the control-amount calculation unit 13. The latter has a number of weight vectors capable of being transmitted as feedback information and uses these vectors to calculate power P, finds the weight vector that will give the maximum power P and adopts this vector as feedback information.

The channel estimation units 23-1 to 23-4 input the impulse responses of respective ones of the transmit antennas to a channel estimation unit 24. The latter obtains an overall impulse response h and inputs the response to a receiver 21 so that the response will be used in demodulation of the data channel. Further, the control-amount calculation unit 13 inputs the obtained weight vector to the multiplexer 18 as feedback information, and the multiplexer 18 multiplexes this feedback information and the transmit data signal. A data modulator 25 performs orthogonal modulation based upon the multiplexed data, and a spread-spectrum modulator 26 applies spread-spectrum modulation to transmit the data signal, which contains the feedback information, from the transmit antenna 14 to the base station.

FIG. 16 illustrates a method of performing synchronous detection using the channel response vectors $\underline{h}_1, \underline{h}_2, \ldots, \underline{h}_N$, which have been obtained from the pilot channel, in order to demodulate the downlink receive data. In this case the channel estimation value used in synchronous detection of the data symbol in receiver 21 is calculated as follows:

$$\underline{h} = H\underline{w} \tag{8}$$

where h represents the channel impulse response vector of the data channel obtained by combination in the receive antenna of the mobile station. The length of the vector is L.

The optimum weight of closed-loop transmit diversity is calculated as the weight that maximizes the power P indicated by Equation (1). In order to find the weight accurately, however, it is necessary to perform a comparison using a value of power P that has been averaged over a certain interval of time. The averaging interval is decided by the receive power of the pilot symbol, fading speed and feedback frequency, etc. That is, if the receive power of the pilot is low, the averaging interval must be lengthened in order to raise the weight accuracy. If the fading speed is low, then the weight can be found accurately by lengthening the averaging interval. Conversely, if the fading speed is high, the averaging interval must be set short. In any case, the averaging interval represents a delay time for finding the optimum weight.

Accordingly, when a base station with which a mobile station is communicating is changed over by handover and closed-loop transmit diversity is started anew, ① a delay is produced and is equivalent to a measurement interval needed to calculate the weight of the base-station antenna at the destination of handover or ② a satisfactory measurement cannot be assured immediately after changeover. Further, there is a delay (feedback delay) that lasts until the antenna weight calculated by the mobile station is multiplexed into the uplink channel signal as feedback information, transmitted to the base station and reflected as the weight of the transmit antenna. This delay also represents a delay up to the time the base station at the handover destination starts closed-loop transmit diversity. Furthermore, another problem is that owing to feedback delay, feedback information that has been transmitted from the mobile station immediately before changeover of the base station is processed as the weight of the base station at the handover destination.

FIG. 17 illustrates an example of the configuration of a conventional system in a case where handover is performed. This shows an example of a case where handover is performed between two base stations 1 and 2. Components identical with those shown in FIG. 13 are designated by like reference characters. All antennas of the base stations 1, 2 and of a mobile station 4 are used for both sending and receiving. Further, the feedback information extraction unit 16 and amplitude and phase controller 17 of FIG. 13 are integrated, provided additionally with an antenna assigning function and illustrated as an antenna assigning and weight control unit 12. Further, the base stations 1 and 2 are identical in structure. Handover is carried out by sending and receiving messages in a higher-order layer between the base stations 1, 2, a base control unit 3, which serves as a host device, and the mobile station 4.

The base stations 1 and 2 are each provided with two transceive antennas 10-1, 10-2 and 20-1, 20-2, respectively. In this case, the base station 1 is also capable of controlling $w_2$ while holding $w_1$ fixed and the base station 2 is capable of controlling $w_4$ while holding $w_3$ fixed.

The mobile station 4 receives only the pilot signals $P_1$, $P_2$ of the base station 1 with which it is currently communicating and calculates the optimum weights $w_1$, $w_2$ of transmit diversity. After a changeover is made to base station 2 by handover, the mobile station 4 starts calculating the antenna weights $w_3$, $w_4$ using the pilot signals $P_3$, $P_4$ of base station 2 at the handover destination.

FIG. 18 illustrates receive control timing and the flow of feedback control in a case where the mobile station 4 is handed over from base station 1 to base station 2. Here the interval over which weight is measured is one slot and the weight is fed back every slot. Further, feedback delay is assumed to be approximately a half slot. If calculation of weight is started immediately after a changeover is made from base station 1 to base station 2, then, as illustrated in FIG. 18, ① the measurement interval immediately after handover must be made the usual one-half slot in order to start transmit diversity from the beginning of the second slot (i.e., the measurement interval is short). Furthermore, ② since the weight that was fed back immediately before handover is the weight of base station 1, it is not used in the first slot immediately after handover and ③ transmit diversity actually starts from the second slot, meaning that control is delayed by one slot.

Feedback delay DL is decided not only by feedback-information transmission delay and processing delay but also by the number of quantization bits of one antenna weight and number of feedback bits assigned to one slot. Now, if antenna weight is quantized by two bits and a single feedback bit is assigned to one slot, then the time needed to feed back one antenna weight will be equivalent to two slots. Furthermore, in the event that the number of transmit antennas of the base station is large, a feedback delay that is proportional to the number of antennas will occur because the control weights of the antennas are fed back in regular order. Accordingly, in a case where the base station has been changed over by handover, a large delay will occur until optimum weights of all antennas are fed back. In other words, immediately after the base station is changed over at handover, a long period of time is required for closed-loop transmit diversity to function fully and characteristics are degraded as a result.

The effects of degraded characteristics appear conspicuously in a situation where high-speed cell selection is performed. High-speed cell selection is a transmission scheme for selecting the base station having the highest receive power level from among a plurality of active base stations in soft handover (base stations communicating simultaneously with a mobile station in soft handover), transmitting data solely from this base station and selectively changing over this base station at high speed to such an extent that it will be possible to follow up fading. As a result, downlink interference is reduced and a stable reception power level can be assured in regard to soft handover in which data is being transmitted from a plurality of base stations simultaneously. However, since base station changeover takes place frequently in this case, there is an increase in the effects of characteristic degradation that occurs by the time closed-loop transmit diversity functions fully immediately following changeover, and a problem which results is that high-speed cell changeover gain is not obtained.

SUMMARY OF THE INVENTION

Accordingly, an object of the present invention is to arrange it so that it is possible to avoid shortening of the antenna-weight measurement interval immediately after a base station is changed over by handover (inclusive of ordinary handover and soft handover).

Another object of the present invention is to arrange it so that antenna control in transmit diversity can be started immediately after handover.

Another object of the present invention is to arrange it so that a satisfactory transmit-diversity gain can be acquired immediately after handover.

Another object of the present invention is to arrange it so that such control can be applied to a system that exhibits a large feedback delay, as is the case with transmit-beam forming, and to a system in which changeover is performed frequently, as in high-speed cell selection.

A first aspect of the present invention is a feedback control method in closed-loop transmit diversity in which feedback information representing at least an amount of phase control is transmitted from a mobile station to a radio base station, the mobile station receiving downlink pilot signals, which are transmitted by a handover-destination base station, during handover control; calculating feedback information, which represents amount of phase control transmitted to the handover-destination base station, beforehand based upon the pilot signals received; and transmitting the feedback information to the handover-destination base station before completion of base-station changeover by handover.

A second aspect of the present invention is a feedback control method in closed-loop transmit diversity in which feedback information representing at least an amount of phase control is transmitted from a mobile station to a radio base station, the mobile station receiving each of downlink pilot signals, which are transmitted by a plurality of base stations, during soft handover control; calculating feedback information, which represents amount of phase control transmitted to each base station, based upon each of the pilot signals received; and transmitting the feedback information to a handover-destination base station before completion of base-station changeover by soft handover.

In accordance with the first and second aspects of the present invention above, it is possible to avoid shortening of the antenna-weight measurement interval immediately after a base station is changed over by handover (ordinary handover or soft handover). Further, antenna control in transmit diversity can be started immediately after handover. Moreover, a satisfactory transmit-diversity gain can be acquired immediately after handover.

DESCRIPTION OF THE PREFERRED EMBODIMENTS

Figure 1:
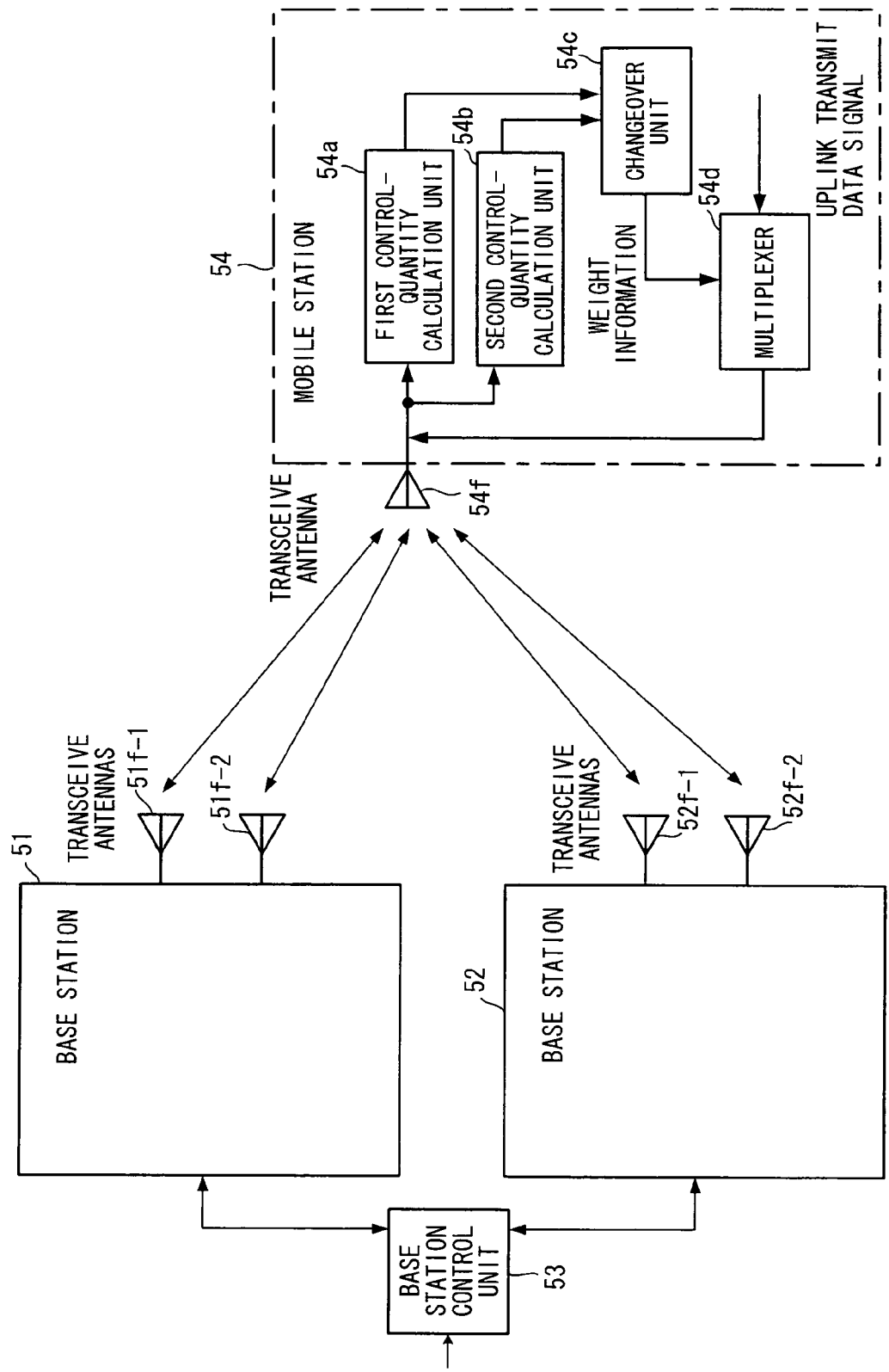
FIG. 1 is a block diagram of a closed-loop transmit diversity system useful in describing a feedback control method according to the present invention.

FIG. 1 is a block diagram of a closed-loop transmit diversity system useful in describing a feedback control method according to the present invention. This illustrates an example of a case where handover is performed between two base stations 51 and 52. The closed-loop transmit diversity system is constituted by the base stations 51, 52, a base station control unit 53, which serves as a host device, and the mobile station 54. The base stations 51, 52, base station control unit 53 and mobile station 54 perform handover control in accordance with a well-known sequence in a higher-order layer, and the mobile station changes over the base station based upon the handover control.

At the time of ordinary communication when handover control is not being carried out, one control-amount calculation unit in the mobile station 54, e.g., a first control-amount calculation unit 54a, receives pilot signals $P_1$, $P_2$ of the base station 51 with which it is currently communicating and calculates the optimum weights $w_1$, $w_2$ of transmit diversity. The first control-amount calculation unit 54a inputs the calculated optimum weights $w_1$, $w_2$ as feedback information into a multiplexer 54d via a changeover unit 54c. The multiplexer multiplexes uplink transmit data and the feedback information and inputs the resultant signal to the base station 51. The latter subjects the downlink transmit data signal to amplitude and phase control based upon the feedback information received and transmits the resultant signal to the mobile station 54. The above-described operation is repeated during ordinary communication when handover control is not being carried out.

Ordinary Handover

If the receive electric field strength from the other base station 52 becomes large in magnitude, a handover control state is attained. In ordinary handover, the mobile station 54 can communicate with only one base station at a time. As a result, if a communication channel TCH is set up between the changeover-destination base station 52 and the mobile station, the mobile station 54 is switched to the frequency of this communication channel, thenceforth sends and receives synchronization and communication bursts to and from the changeover-destination base station 52 for the purpose of establishing synchronization and for adjusting time alignment, and finally resumes communication for the original call with the changeover-destination base station 52 following the completion of start-up of the communication channel TCH. As a consequence, the call is interrupted from the moment the frequency is switched to the moment start-up of the communication channel TCH is completed. Conventionally, the mobile station 54 calculates the weighting coefficients (weights) of the base station 52 following completion of start-up of the communication channel TCH. Since calculation of antenna weights is begun after handover, a delay is produced until the actual effect of transmit diversity appears, the delay arising from the antenna-weight measurement interval and the effect of feedback delay.

Accordingly, in the present invention, the antenna weights of the base station 52 are calculated earlier. More specifically, after the mobile station 54 is switched to the frequency of the communication channel TCH that has been set up in handover control, a second control-amount calculation unit 54b is instructed to start calculation of the antenna weights of base station 52 at the same time that preparations begin for starting up the communication channel TCH. As a result, the second control-amount calculation unit 54b receives the pilot signals $P_3$, $P_4$ of the base station 52 and calculates the optimum weights $w_3$, $w_4$ of transmit diversity. Taking the delay time into consideration, the second control-amount calculation unit 54b transmits the weights $w_3$, $w_4$ to the base station 52 a prescribed period of time before the timing at which the base station is changed over. On the basis of the weights $w_3$, $w_4$ received, the base station 52 subjects the downlink transmit data signal to amplitude and phase control and transmits the resultant signal to the mobile station 54. As a result, the base station 52 is capable of exercising transmit diversity control simultaneous with start of original communication. From this time onward, transmit diversity control for when ordinary communication devoid of handover control is performed is carried out.

Soft Handover

If the receive field strength from the other base station 52 becomes large in magnitude, the handover control state is attained. In soft handover, the mobile station 54 can communicate with two or more base stations at the same time. When the communication channel TCH between the base station 52 and mobile station is set up, the mobile station 54 establishes a radio link with the base station 52 while continuing to communicate with the base station 51 to maintain the call. When the strength of the pilot signal from the base station 51 falls below a set level continuously for more than a set period of time in such soft handover, changeover of the base station by soft handover is carried out and the mobile station 54 starts communicating with the base station 52 for the purpose of this call (the original call). With such soft handover, the call is not interrupted. Conventionally, however, the mobile station 54 calculates the antenna weighting coefficients (weights) of the base station 52 after it starts communicating with the base station 52 for the original call. Since calculation of the antenna weights is started after changeover of the base station by soft handover, a delay is produced until the actual effect of transmit diversity appears, the delay arising from the antenna-weight measurement interval and the effect of feedback delay.

Accordingly, in the present invention, the antenna weights of the base station 52 are calculated earlier. More specifically, if the mobile station 54 establishes a radio link with the base station 52 in soft handover, then the second control-amount calculation unit 54b is immediately instructed to start calculation of the antenna weights of base station 52. As a result, in concurrence with the weight calculations by the first control-amount calculation unit 54a, the second control-amount calculation unit 54b receives the pilot signals $P_3$, $P_4$ of the base station 52 and calculates the optimum weights $w_3$, $w_4$ of transmit diversity. Taking the delay time of feedback control into consideration, the second control-amount calculation unit 54b transmits the weights $w_3$, $w_4$ to the base station 52 a prescribed period of time before the timing at which the base station is changed over. On the basis of the weights $w_3$, $w_4$ received, the base station 52 subjects the downlink transmit data signal to amplitude and phase control and transmits the resultant signal to the mobile station 54. As a result, the base station 52 is capable of exercising transmit diversity control simultaneous with start of original communication. From this time onward, transmit diversity control for when ordinary communication devoid of handover control is performed is carried out.

In summary of the above, therefore, the mobile station 54 receives not only the pilot signals of base station 51 with which it is currently communicating but also the pilot signals of the handover-destination base station 52 at the same time and calculates the optimum weights of the antennas of both base stations. Then, at a previously set timing, which is equivalent to the feedback delay, prior to changeover of the base station by handover, the mobile station 54 transmits feedback information to the handover-destination base station 52, thereby causing the weights to change over.

Figure 2:
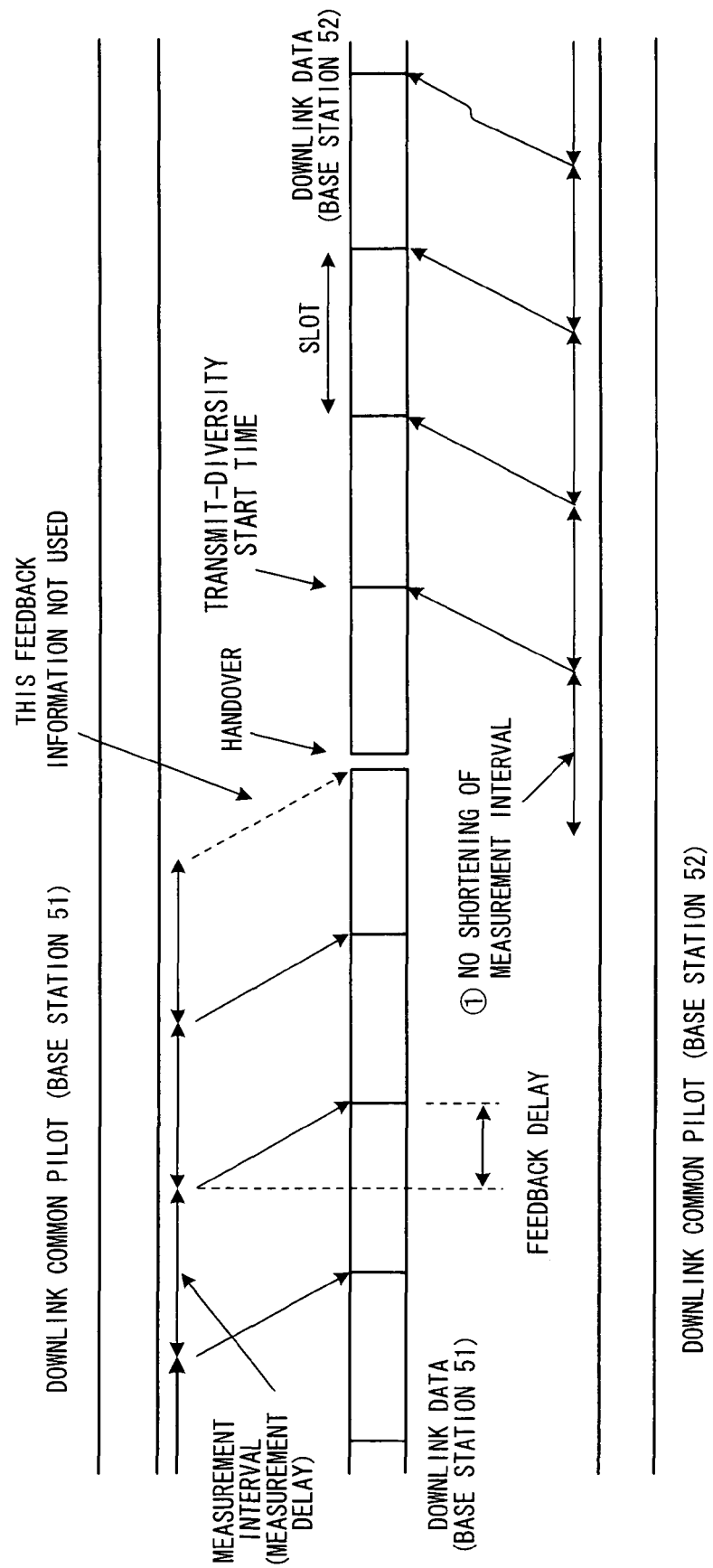
FIG. 2 is an explanatory view illustrating receive control timing and feedback control in the present invention.
Figure 18:
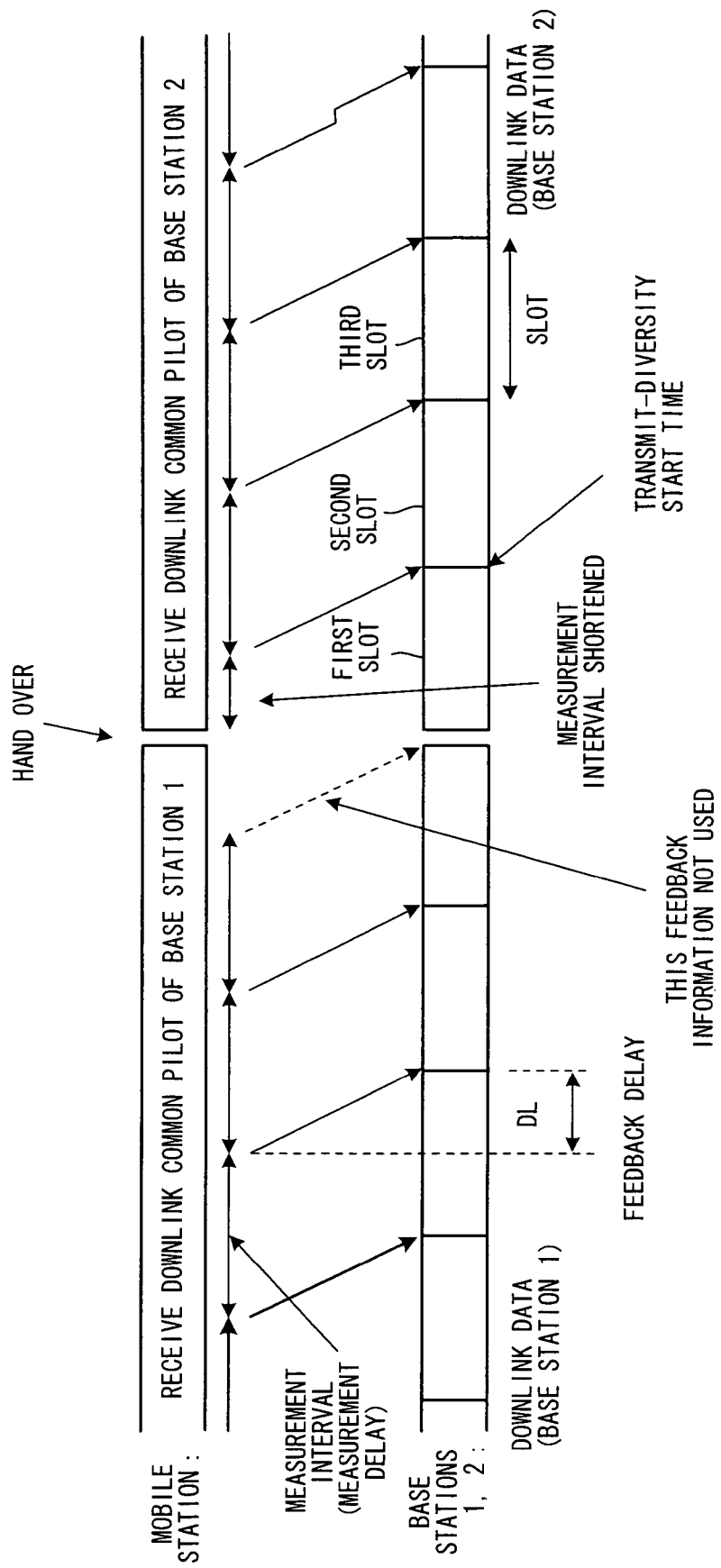
FIG. 18 is a diagram useful in describing receive control timing in a case where handover has been performed.

FIG. 2 illustrates receive control timing and feedback control in the present invention when the mobile station 54 is handed over from the base station 51 to the base station 52. The mobile station 54 calculates weights using the pilots of the base station 52 before base station 51 is changed over to base station 52 by handover. Accordingly, the measurement interval that immediately follows handover is no longer shortened (see ①), as occurs conventionally (see FIG. 18), and antenna weights can be calculated in highly accurate fashion. This effect appears more conspicuously in cases where the measurement interval is long.

Figure 3:
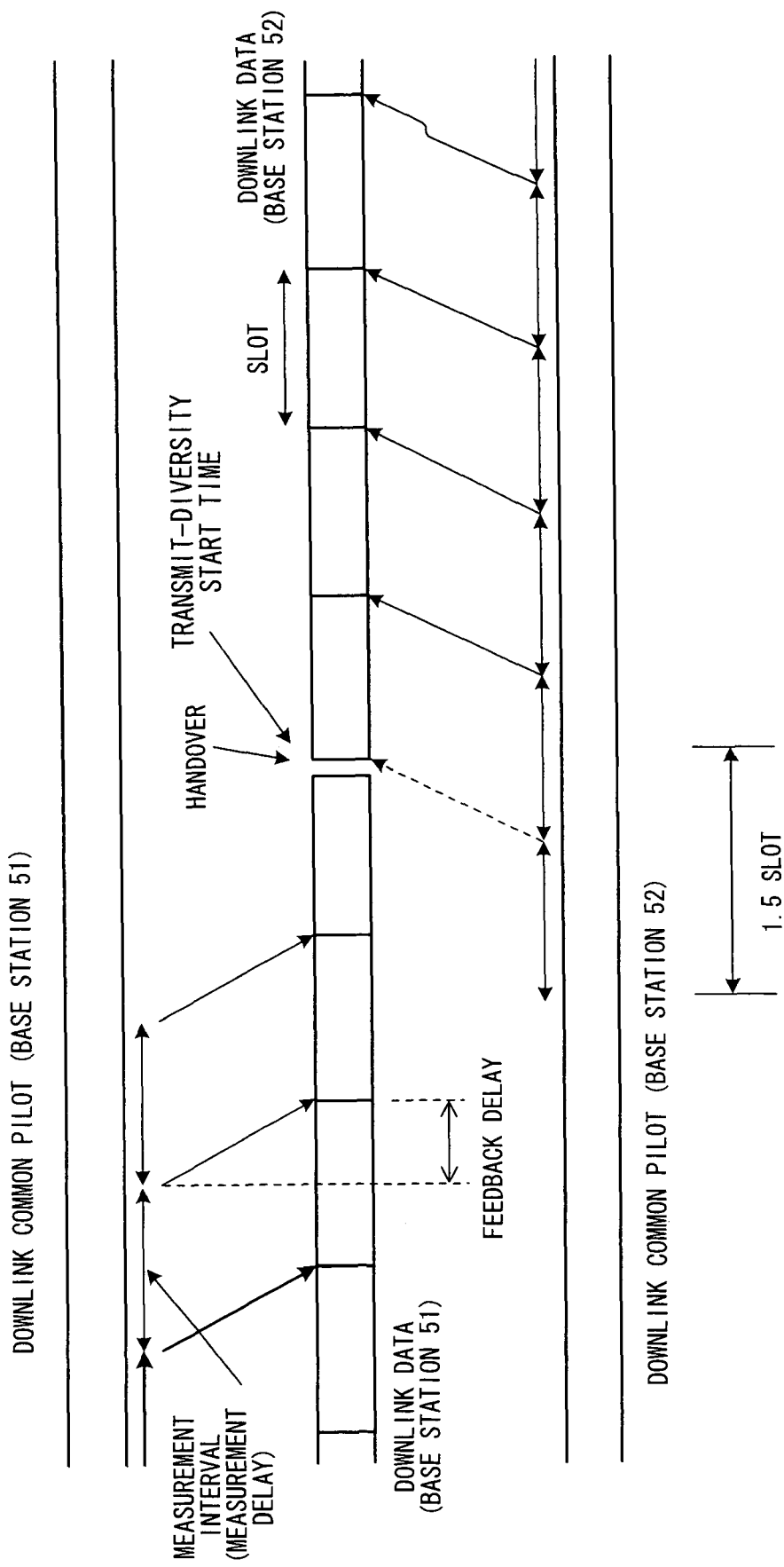
FIG. 3 is another explanatory view illustrating receive control timing and feedback control in the present invention.

FIG. 3 is another explanatory view illustrating receive control timing and feedback control in the present invention. Here the measurement interval over which antenna weights are calculated is one slot and the feedback delay is a half slot. Accordingly, measurement of antenna weights is started one-half frame earlier than handover timing by using the pilot symbols of the base station 52. As a result, transmit diversity control of base station 52 can be started immediately after handover.

(B) FIRST EMBODIMENT

Figure 4:
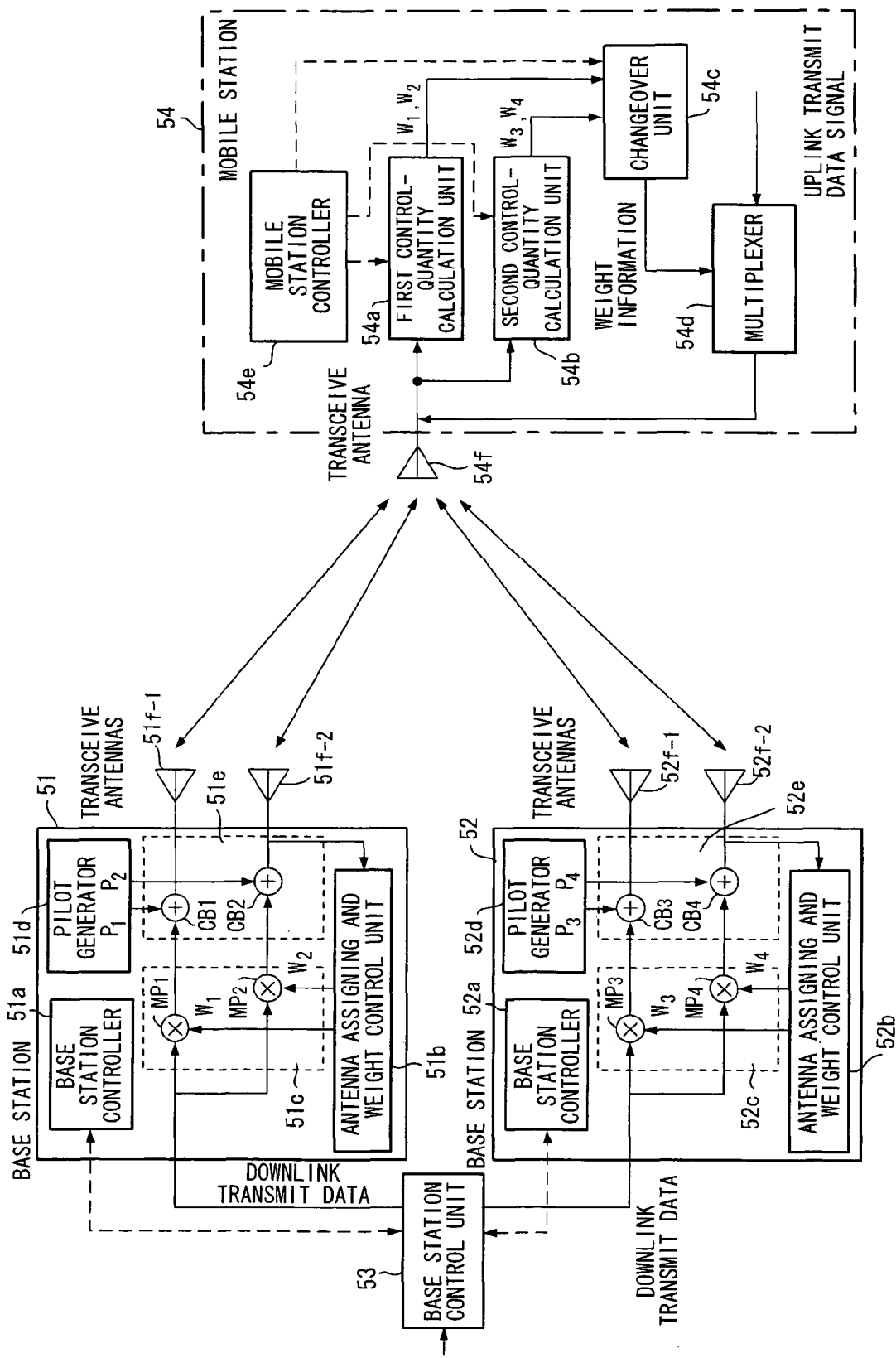
FIG. 4 is a diagram illustrating the configuration of a closed-loop transmit diversity system in a first embodiment of the present invention.

FIG. 4 is a diagram illustrating the configuration of a closed-loop transmit diversity system in a first embodiment of the present invention. This illustrates an example of a case where handover is performed between two base stations. Components identical with those shown in FIG. 1 are designated by like reference characters. This arrangement differs from that of FIG. 1 in that the structure of the base stations 51, 52 is clarified and in that the mobile station 54 is provided internally with a mobile station controller 54e for performing handover and other control.

The base stations 51 and 52 are identical in structure and respectively include base station controllers 51a, 52a for exercising control such as handover; antenna assigning and weight control units 51b, 52b for performing antenna assignment and control of weights; weight multiplication units 51c, 52c for calculating weights $w_1$, $w_2$ and $w_3$, $w_4$; pilot generators 51d, 52d for generating pilots $P_1$, $P_2$ and $P_3$, $P_4$; pilot combiners 51e, 52e for combining pilots with transmit data; and two transceive-antennas 51f-1, 51f-2 and 52f-1, 52f-2. The antennas 51f-1, 51f-2 are disposed and spaced apart by, e.g., a distance of 20 wavelengths (20λ) in such a manner that fading correlation will be sufficiently small (uncorrelated), i.e., in such a manner that the diversity effect will manifest itself. Similarly, the antennas 52f-1, 52f-2 are disposed and spaced apart sufficiently, e.g., by a distance of 20 wavelengths (20λ).

If the prevailing state in not the handover state, then, in the base station (e.g., assume that this is base station 51) currently communicating with the mobile station 54, the pilot signal generator 51d generates the mutually orthogonal pilot signals $P_1$, $P_2$, and combiners $CB_1$, $CB_2$ in the pilot combiner 51e combine the pilot signals with transmit data and transmit the resultant signals from the transmit antennas 51f-1, 51f-2. The first control-amount calculation unit 54a of mobile station 54 correlates the received pilot signals $P_1'$, $P_2'$ and the corresponding known pilot signals $P_1$, $P_2$, thereby estimating channel impulse response vectors $h_1$, $h_2$ from the transmit antennas 51f-1, 51f-2 of base station 51 to a receive antenna 54f at the mobile station, and then uses these channel estimation values to calculate an amplitude and phase control vector (weight vector) $\mathbf{w}=[w_1,w_2]^T$ of the transmit antennas 51f-1, 51f-2 of the base station 51, which vector maximizes power P indicated by Equation (1). The first control-amount calculation unit 54a quantizes the vector, inputs the result to the multiplexer 18 as feedback information via the changeover unit 54c, and the multiplexer 18 multiplexes this feedback information and the uplink transmit data signal and transmits the resultant signal from the receive antenna 54f to the side of the base station. It should be noted that it is unnecessary to transmit both the values $w_1$, $w_2$, it being sufficient to transmit only the value $w_2$ in a case where $w_1$ is obtained as $w_1=1$.

At the base station 51 the feedback information from the mobile station 54 is received by the receive antenna 51f-2. The antenna assigning and weight control unit 51b extracts the weighting coefficients $w_1$, $w_2$ serving as the control quantities, and the downlink transmit data is multiplied by the weighting coefficients $w_1$, $w_2$ using the multipliers $MP_1$, $MP_2$ of the weight multiplication unit 51c. The results of multiplication are transmitted from the transmit antennas 51f-1, 51f-2. As a result, the mobile station 54 is capable of receiving signals transmitted from the two diversity transmit antennas 51f-1, 51f-2 in an efficient manner. Similar control is thenceforth carried out.

The foregoing is for a case where communication is carried out between the base station 51 and the mobile station 54. Operation is similar also in a case where communication is carried out between the base station 52 and the mobile station 54. In this case, however, the second control-amount calculation unit 54b correlates the received pilot signals $P_3'$, $P_4'$ and the corresponding known pilot signals $P_3$, $P_4$, thereby estimating channel impulse response vectors $h_3$, $h_4$ from the transmit antennas 52*f*-1, 52*f*-2 of base station 52 to the receive antenna 54*f* at the mobile station, and then uses these channel estimation values to calculate an amplitude and phase control vector (weight vector) $w=[w_3,w_4]^T$ of the transmit antennas 52*f*-1, 52*f*-2 of the base station 52, which vector maximizes power P indicated by Equation (1).

Figure 5:
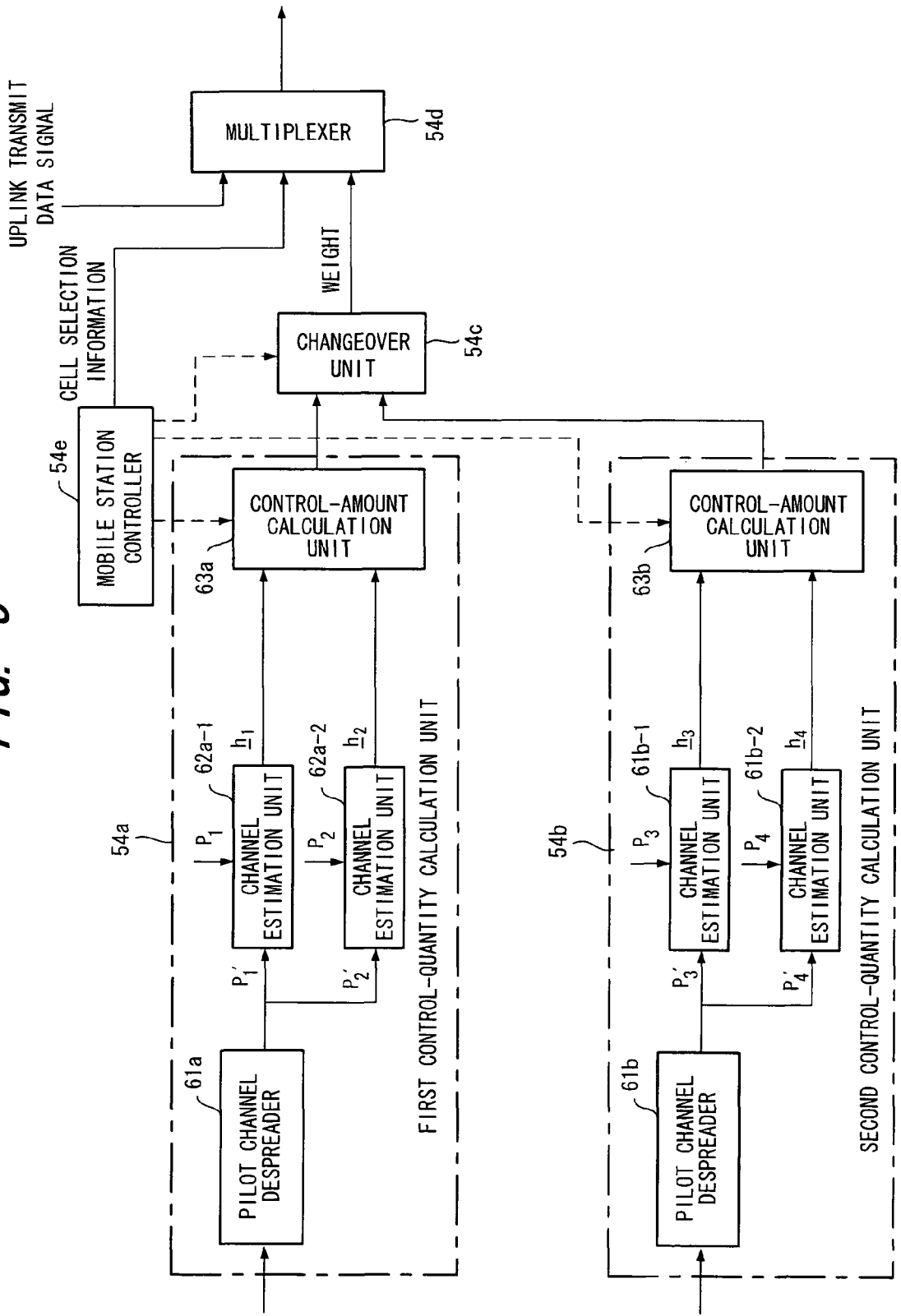
FIG. 5 is a diagram useful in describing the structure of a control-amount calculation unit.

FIG. 5 is a diagram useful in describing the structure of the first and second control-amount calculation units 54*a*, 54*b*. In the first control-amount calculation unit 54*a*, a pilot channel despreader 61*a* despreads the pilot channel of the receive signal and outputs the pilot signals $P_1'$, $P_2'$. Channel estimation units 62*a*-1, 62*a*-2 calculate the correlation between the receive pilot signals $P_1'$, $P_2'$ obtained by despreading and known pilot signals $P_1$, $P_2$ and calculate the channel estimation values $h_1$, $h_2$ from the transmit antennas 51*f*-1, 51*f*-2 of base station 51 to the receive antenna 54*f*. A control-amount calculation unit 63*a* uses these channel estimation values to calculate a weight vector $w=[w_1,w_2]^T$ of the transmit antennas 51*f*-1, 51*f*-2 of base station 51, which weight vector maximizes power P indicated by Equation (1).

Further, in the second control-amount calculation unit 54*b*, a pilot channel despreader 61*b* despreads the pilot channel of the receive signal and outputs the pilot signals $P_3'$, $P_4'$. Channel estimation units 62*b*-1, 62*b*-2 calculate the correlation between the receive pilot signals $P_3'$, $P_4'$ obtained by despreading and known pilot signals $P_3$, $P_4$ and calculate the channel estimation values $h_3$, $h_4$ from the transmit antennas 52*f*-1, 52*f*-2 of base station 52 to the receive antenna 54*f*. A control-amount calculation unit 63*b* uses these channel estimation values to calculate a weight vector $w=[w_3,w_4]^T$ of the transmit antennas 52*f*-1, 52*f*-2 of base station 52, which weight vector maximizes power P indicated by Equation (1).

Ordinary Handover

Figure 6:
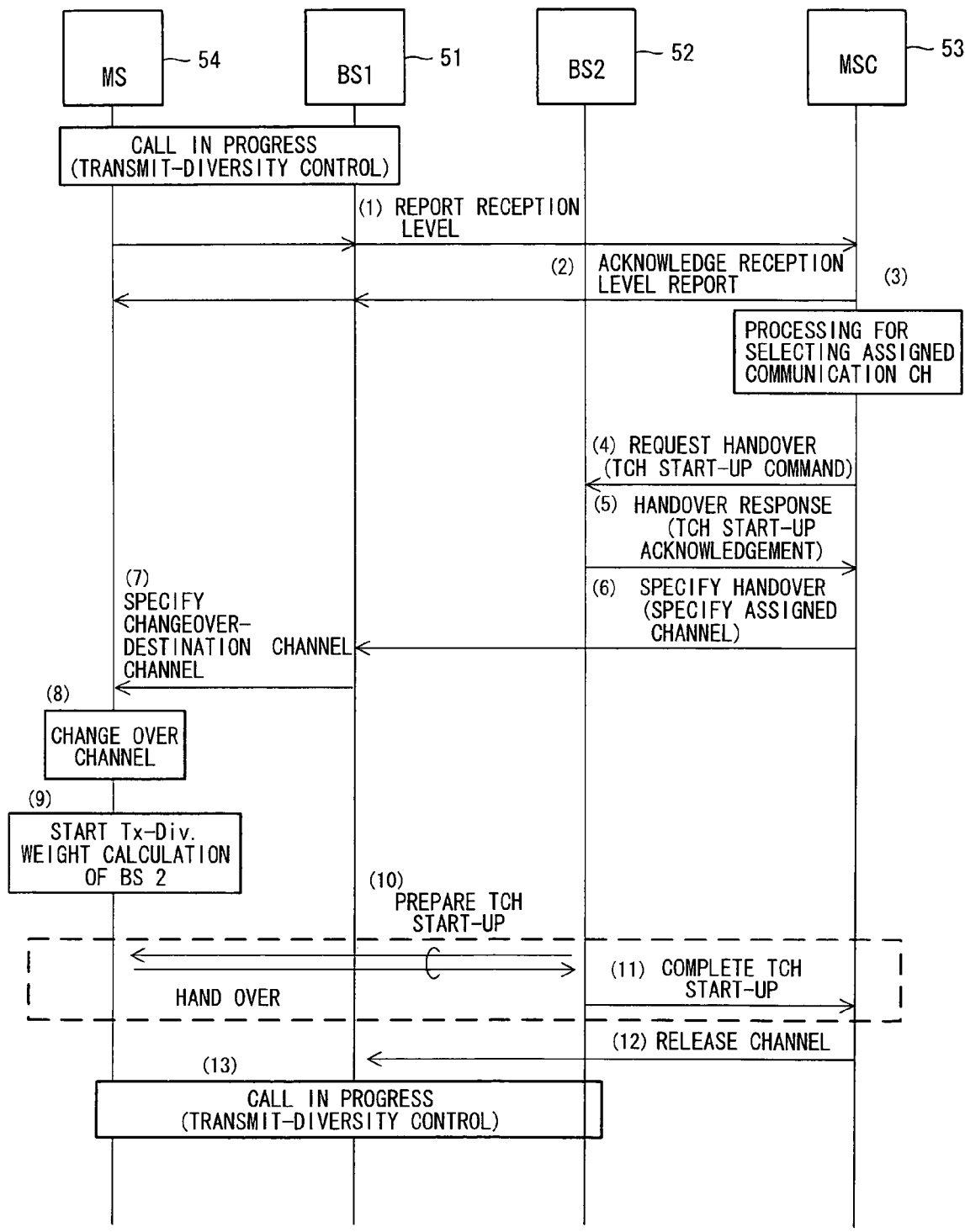
FIG. 6 is a diagram useful in describing a sequence at the time of handover.

If the receive electric field strength from the other base station 52 becomes large in magnitude when communication with base station 51 is being carried out, handover control starts in accordance with the sequence shown in FIG. 6.

Specifically, if the electric field strength from the other base station 52 becomes large in magnitude, the mobile station 54 reports the radio state (the reception levels from radio base stations in the vicinity) to the base station control unit 53 via the base station 51 (step 1).

If it receives the radio status report (a channel changeover request), the base station control unit 53 sends an acknowledgement response back to the mobile station 54 (step 2). The base station control unit 53 thenceforth selects a communication channel TCH assigned to communication between the mobile station 54 and the base station 52, which is destination of changeover (step 3), and instructs the base station 52 to start up the communication channel TCH (REQUEST HANDOVER; step 4). If it receives the TCH start-up command, the base station 52 issues an acknowledgement response (step 5).

Next, the base station control unit 53 notifies the communicating base station 51 of the assigned communication channel TCH (step 6), and the base station 51 reports the communication channel of which it has been notified to the mobile station 54 as the communication channel of the handover destination (step 7). Upon receiving the communication channel TCH of the handover destination, the mobile station 54 immediately switches over to the channel conforming to this communication channel TCH to establish a state that enables communication with the base station 52 (step 8). At the same time, the mobile station controller 54*e* (FIG. 4) instructs the second control-amount calculation unit 54*b* to start weight calculation, instructs the first control-amount calculation unit 54*a* to terminate weight calculation and instructs the changeover unit 54*c* to select and output the weight information that is the result of calculation by the second control-amount calculation unit 54*b* (step 9). It should be noted that the second control-amount calculation unit 54*b* calculates the weights that conform to the transceive antennas 52*f*-1, 52*f*-2 of the base station 52.

This is followed by the sending and receiving of synchronization and communication bursts between the changeover-destination base station 52 and mobile station 54 for the purpose of establishing synchronization and for adjusting time alignment (step 10). If normal communication becomes possible, the changeover-destination base station 52 reports completion of TCH start-up to the base station control unit 53 (step 11). Upon receiving the TCH-start-up completion signal, the base station control unit 53 instructs the base station 51 to release the channel, thereby completing handover (12).

Since the mobile station 54 calculates the weights $w_3$, $w_4$ of the antennas of base station 52 in the manner described above, the mobile station 54 can transmit the weights $w_3$, $w_4$ to the base station 52 a prescribed length of time before the time at which the original communication with the base station 52 starts. As a result, the base station 52 subjects the downlink transmit data signal to amplitude and phase control based upon the weights $w_3$, $w_4$ received and transmits the resultant signal to the mobile station 54. This means that transmit diversity control can be carried out at the same time as the start of the original communication. This is followed by execution of transmit diversity control for when normal communication, which is communication devoid of handover control, is performed (step 13).

Soft Handover

Figure 7:
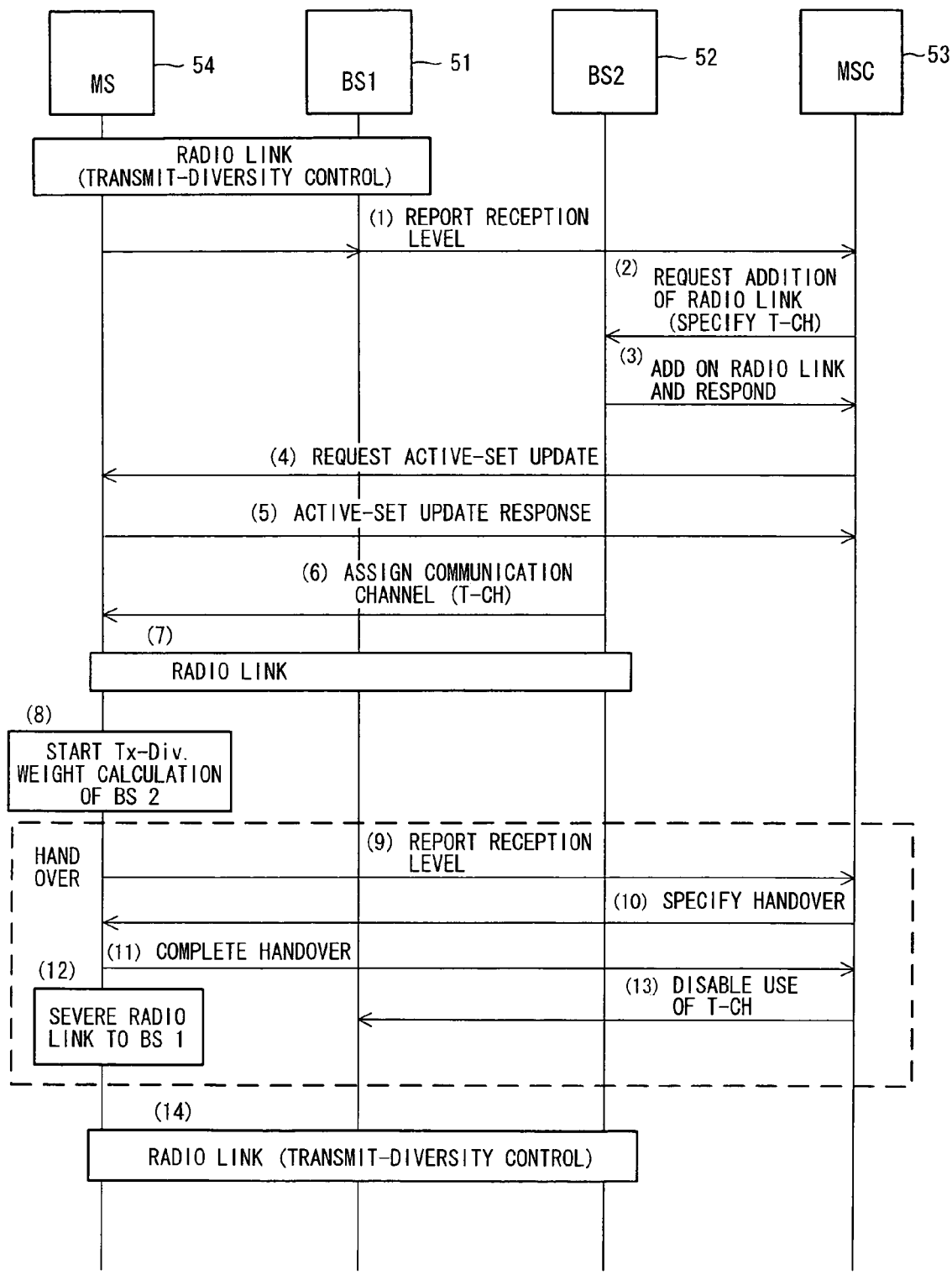
FIG. 7 is a diagram useful in describing a sequence at the time of soft handover.

The foregoing is the case when ordinary handover is performed. Handover control starts in accordance with the sequence of FIG. 7 in case of soft handover.

Specifically, if the electric field strength from the other base station 52 becomes larger than a set level, the mobile station 54 communicates a reception-level report message to the base station control unit 53 via the base station 51 (step 1). Upon receiving this message, the base station control unit 53 instructs the base station 52 of the communication channel TCH that is to be assigned to the mobile station 54 (REQUEST ADDITION OF RADIO LINK; step 2). In response to the request to add on the radio link, the base station 52 sends a response to the radio-link add-on request back to the base station control unit 53.

Next, the base station control unit 53 sends an active-set update request to the mobile station 54 via the base stations 51, 52 (step 4). Upon receiving the active-set update request, the mobile station 54 sends an active-set update response back to the base station control unit 53 (step 5) and acquires the communication channel TCH from the base station 52 (step 6).

The mobile station 54 thenceforth becomes capable of communicating with the base station 52 on the communication channel (ESTABLISH RADIO LINK; step 7) and communicates with the base stations 51, 52 simultaneously. Further, at the same time, the mobile station controller 54*e* (FIG. 4) instructs the second control-amount calculation unit 54*b* to start weight calculation (step 8). As a result, the first and second control-amount calculation units 54*a*, 54*b* perform weight calculation concurrently. It should be noted that the second control-amount calculation unit 54*b* calculates the weights $w_3$, $w_4$ that conform to the transceive antennas 52*f*-1, 52*f*-2 of the base station 52.

If under these conditions the strength of the pilot signals from the base station 51 falls below a set level continuously for more that a set period of time, then the mobile station 54 reports the reception level to the base station control unit 53 via the base station 51 (step 9). In response to being so notified, the base station control unit 53 decides to terminate communication between the mobile station 54 and the base station 51 and instructs the mobile station 54 of handover via the base stations 51, 52 (step 10). Upon being instructed of handover, the mobile station 54 transmits completion of handover to the base station control unit 53 (step 11) and severs the radio link to the base station 51 (step 12). Upon receiving handover completion, the base station control unit 53 instructs the base station 51 to disable use of the communication channel (step 13) and completes handover control.

Since the mobile station 54 calculates the weights $w_3$, $w_4$ of the antennas of base station 52 in the manner described above, the mobile station 54 can transmit the weights $w_3$, $w_4$ to the base station 52 a prescribed length of time before the time at which the original communication with the base station 52 starts. As a result, the base station 52 subjects the downlink transmit data signal to amplitude and phase control based upon the weights $w_3$, $w_4$ received and transmits the resultant signal to the mobile station 54. This means that transmit diversity control can be carried out at the same time as the start of the original communication. This is followed by execution of transmit diversity control for when normal communication, which is communication devoid of handover control, is performed (step 14).

Thus, in accordance with the first embodiment, the mobile station 54 receives not only the pilot signals of the base station 51 with which it is currently communicating but also the pilot signals of the handover-destination base station 52 at the same time and calculates the optimum weights of the antennas of both base stations. The mobile station 54 changes the feedback information over to the weights of the handover-destination base station 52 at a previously set earlier timing, which is equivalent to the feedback delay, prior to changeover of the base station by handover. As a result, transmit-diversity antenna control can be started without delay immediately after handover. Moreover, a sufficient transmit diversity gain can be obtained immediately after handover.

(C) SECOND EMBODIMENT

A second embodiment is an example in which the present invention is applied to high-speed cell selection in soft handover. High-speed cell selection is a transmission scheme for selecting the base station having the highest reception power level from among a plurality of active base stations in soft handover, transmitting data solely from this base station and selectively changing over this base station at high speed to such an extent that it will be possible to follow up fading.

Configuration of Closed-loop Transmit Diversity System in Second Embodiment

Figure 8:
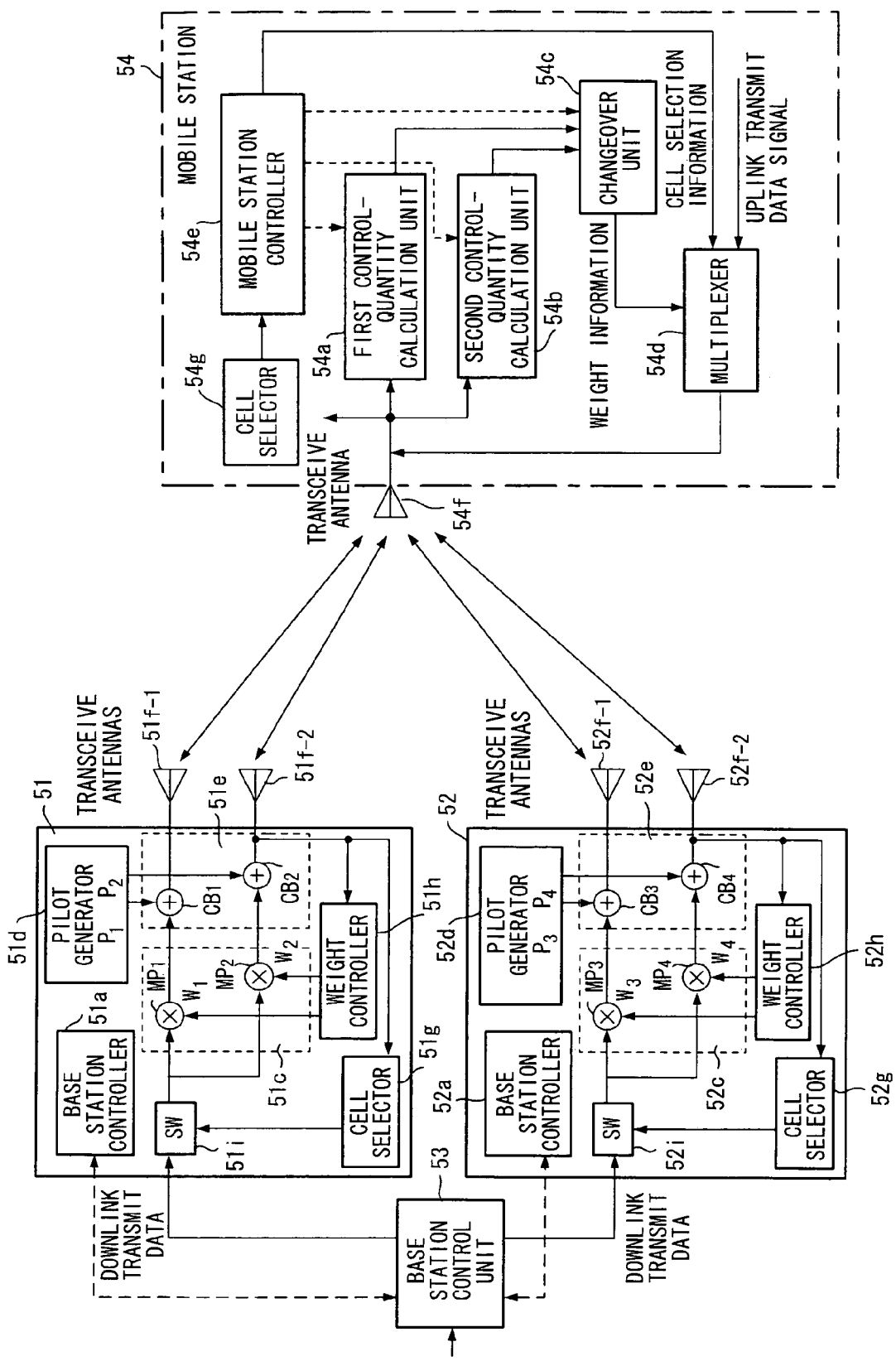
FIG. 8 is a diagram illustrating the configuration of a closed-loop transmit diversity system in a second embodiment.

FIG. 8 is a diagram illustrating the configuration of a closed-loop transmit diversity system in a second embodiment. This illustrates an example for a case where handover is performed between two base stations. Components identical with those of the first embodiment shown in FIG. 4 are designated by like reference characters. The embodiment differs from the first embodiment in that:

(1) the mobile station 54 is provided with a cell selector 54g;

(2) cell selectors 51g, 52g and weight controllers 51h, 52h are provided instead of the antenna assigning and weight control units of the base stations 51, 52.

Assume that the soft-handover state is in effect. The mobile station 54 despreads the data channel of the signal received from either of the base stations 51, 52, thereby demodulating and outputting the transmit data. In concurrence with the above, the cell selector 54g of mobile station 54 measures the receive power of the pilot channels of the base stations 51, 52 and notifies the mobile station controller 54e of the base station having the higher receive power. The mobile station controller 54e ① instructs both of the control-amount calculation units 54a, 54b to execute weight calculation at the time of soft handover; ② instructs the mobile station controller 54e to select and output the weights from the control-amount calculation unit corresponding to the base station having the higher receive power; and ③ inputs the cell selection information, which indicates selection of the base station having the higher receive power, to the multiplexer 54d. The latter multiplexes weights $w_i$, $w_j$, which have entered from the control-amount calculation unit conforming to the base station having the higher receive power, the cell selection information and the uplink transmit data signal and transmits the resultant signal to the base stations 51, 52.

The weight controllers 51h, 52h of each of the base stations respectively extract weights $w_1$, $w_2$ and $w_3$, $w_4$, which are amplitude/phase control data, from the receive signal and control the multipliers 51c, 51d to multiply downlink transmit data by these weights. Further, the cell selectors 51g, 52g extract the cell selection information from the receive signal, open switches 51i, 52i to pass the downlink transmit data if their own base stations have been designated, and close the switches 51i, 52i to block the downlink transmit data if their own base stations have not been designated. Accordingly, transmit data is transmitted solely from the base station having the higher receive power and only pilot signals are transmitted from the base station having the lower transmit power. The mobile station 54 constantly performs the above-described control and receives transmit data from the base station of high receive power at all times.

Principal Structure of Mobile Station

Figure 9:
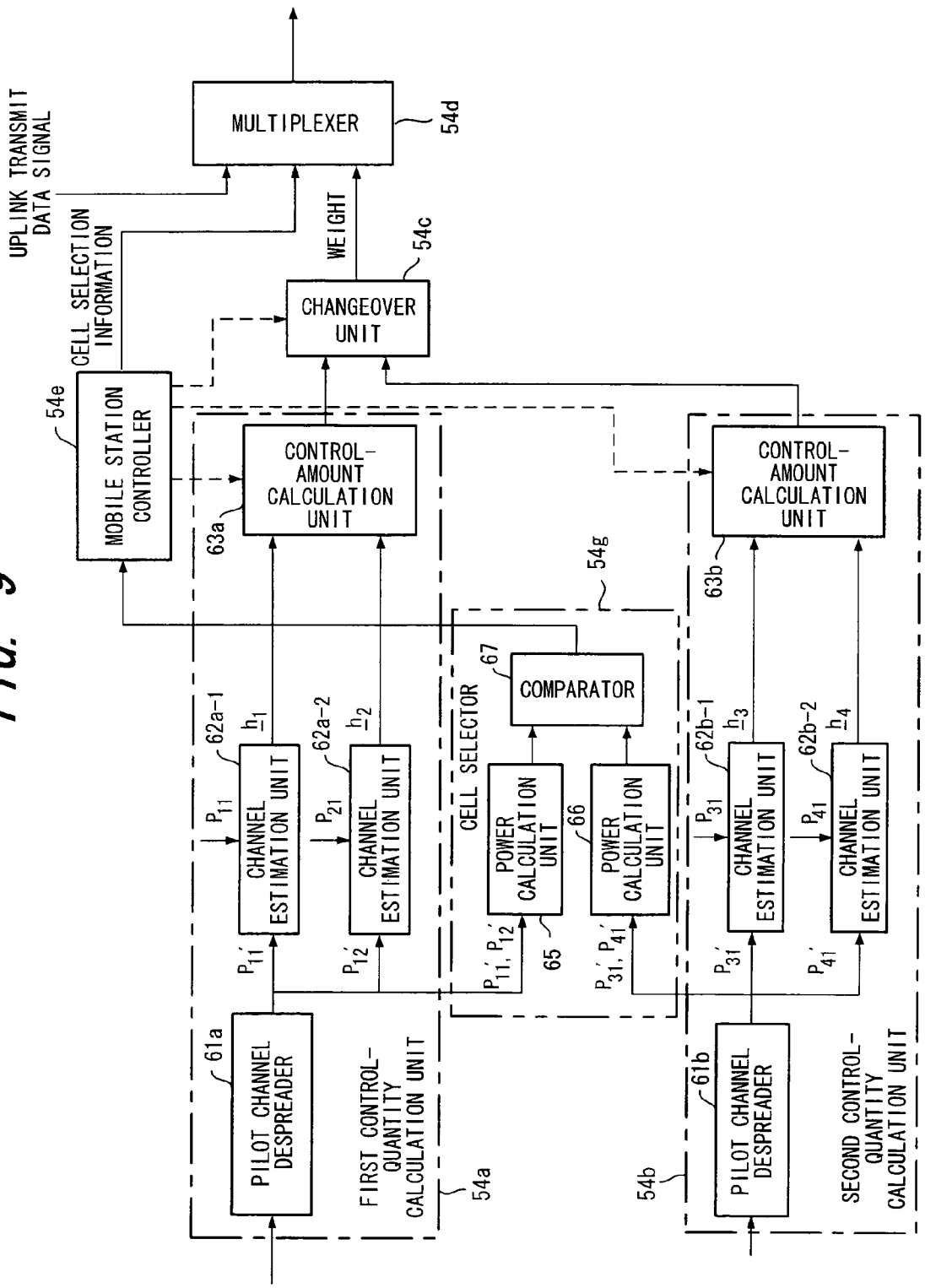
FIG. 9 is a block diagram of a principal portion of a mobile station.

FIG. 9 is a block diagram of a principal portion of a mobile station, in which components identical with those shown in FIG. 5 are designated by like reference characters. A power calculation unit 65 in the cell selector 54g calculates the receive power of the pilots received from the base station 51, a power calculation unit 66 calculates the receive power of the pilots received from the base station 52, and a comparator 67 compares the two values of power and notifies the mobile station controller 54e of the base station having the higher power. The mobile station controller 54e responds by exercising the control described above.

Control of High-speed Cell Selection

High-speed cell selection is performed without the intervention of the base station control unit 53 when soft handover is performed. However, the active base stations 51, 52 linked by radio have temporary IDs assigned thereto by the base station control unit 53. The mobile station 54 measures the receive power of a common pilot channel, etc., thereby measuring the reception quality of all active sets. The mobile station 54 reports the ID-number of the base station having the best quality to the base station by way of the cell selection information. The selected base station (the primary cell) transmits a data signal to the mobile station 54 but the unselected base station (the non-primary cell) halts the transmission of a data signal. At the same time that the data transmitting base station is changed over by high-speed cell selection, the mobile station starts transmit diversity between itself and the new primary cell. Conventionally, however, a problem which arises is that since the calculation of antenna weights is started after the changeover of the base station, a delay, which lasts until the actual effect of transmit diversity appears, is produced owing to measurement interval of the antenna weights and the effects of feedback delay.

According to the second embodiment, therefore, if high-speed cell selection is performed at the time of soft handover, the mobile station communicates continuously with the two base stations and receives transmit data from the base station having the higher receive power. At this time the control-amount calculation units 54a, 54b corresponding to respective ones of the base stations constantly perform weight calculations. Even when base stations are changed over at high speed, therefore, the changeover command and calculated weights can be transmitted simultaneously and it is possible to simultaneously execute the original communication control by the changeover-destination base station and transmit diversity control.

Figure 10:
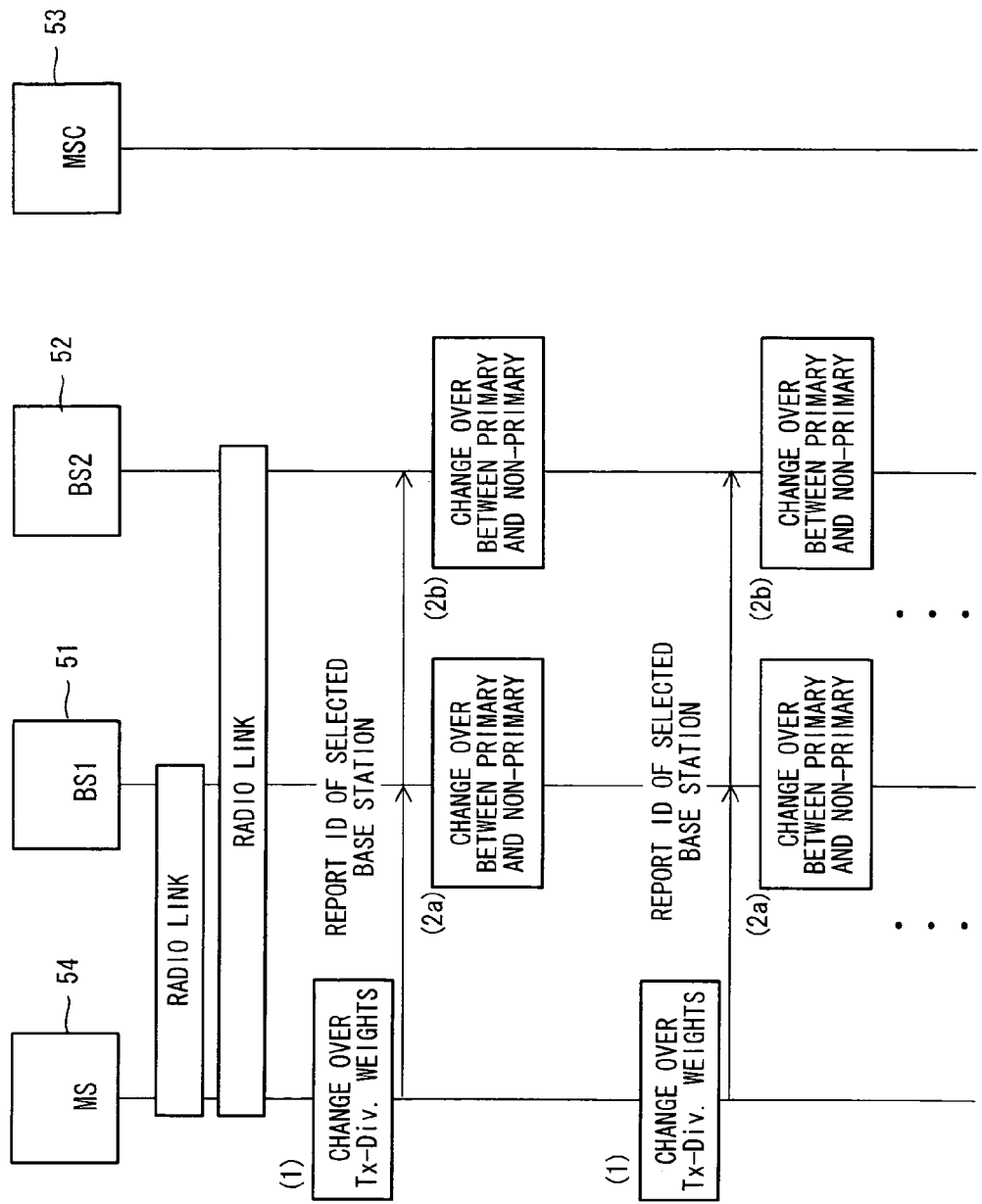
FIG. 10 is a diagram useful in describing a sequence in a case where high-speed cell selection is performed at the time of soft handover.

FIG. 10 is a diagram useful in describing a sequence in a case where high-speed cell selection is performed at the time of soft handover. It is assumed that soft-handover state is already in effect and that a radio link has been established between the mobile station 54 and each of the base stations 51, 52.

At the time of soft handover, the mobile station 54 separately calculates, the transmit-diversity control quantities (weights) of the base stations 51, 52, which are the active sets, simultaneously (step 1). The mobile station 54 then selects as the primary cell the base station having the higher receive power P. The multiplexer 54d of the mobile station 54 multiplexes the selected primary base station ID, the transmit-diversity weights of this base station and the uplink transmit data and transmits the resultant signal to the base stations 51, 52. The base stations 51, 52 receive the ID of the selected base station and the antenna-control weight information fed back from the mobile station 54, and only the base station having the matching ID executes amplitude and phase control using the weights of transmit diversity and transmits the downlink transmit data (steps 2a, 2b). The above-described operation is subsequently repeated and the system eventually exits soft handover.

Thus, in accordance with the second embodiment, the weights of transmit diversity are calculated and base-station selection information and weights are transmitted simultaneously before the ID of the selected base station (the cell selection information) is fed back. As a result, the effects of transmit diversity can manifest themselves without delay at the instant the primary cell is changed over.

(D) THIRD EMBODIMENT

Figure 11:
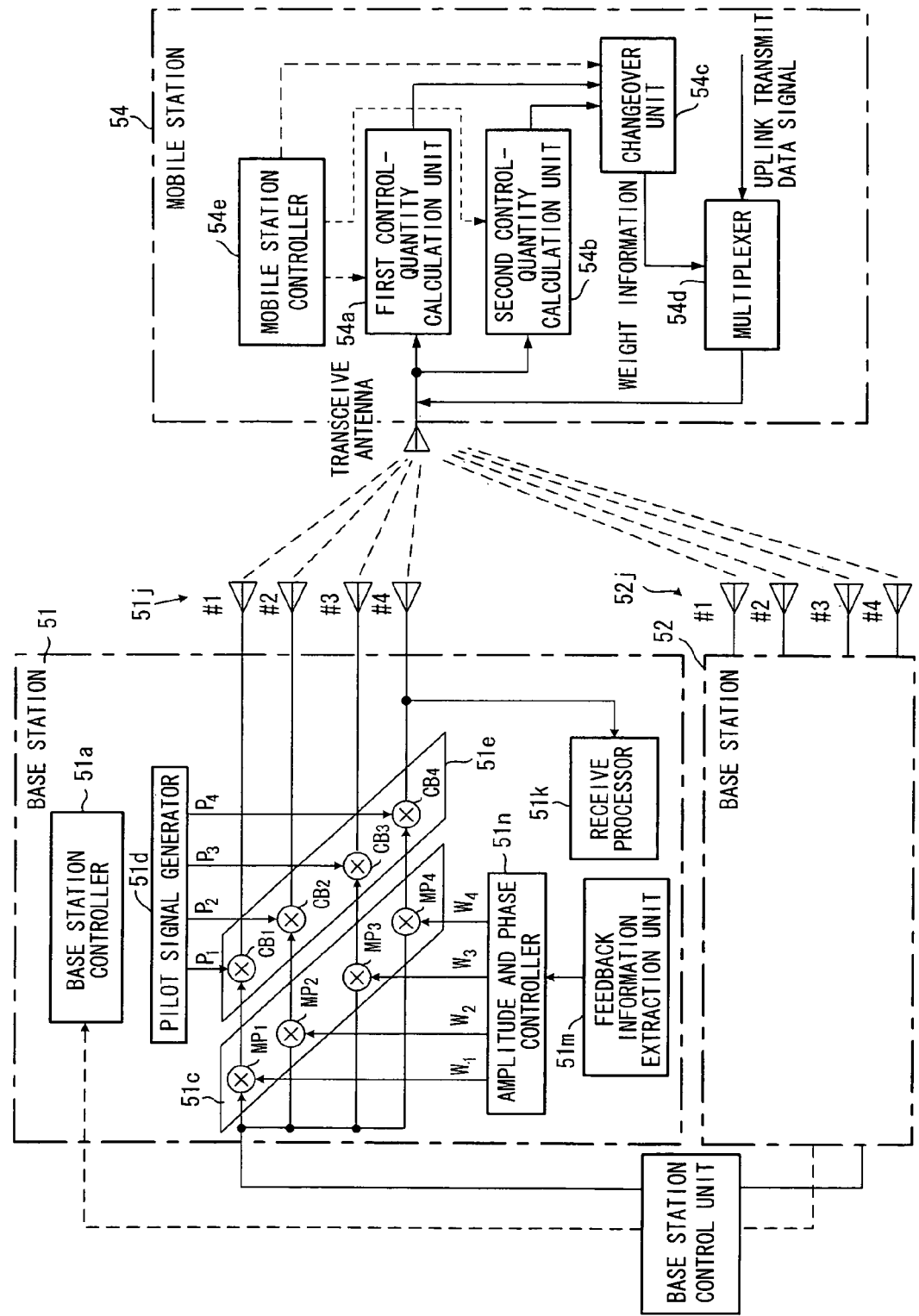
FIG. 11 is diagram illustrating the configuration of a closed-loop transmit beam forming system.

FIG. 11 is diagram illustrating the configuration of a closed-loop transmit beam forming system. Components identical with those of the first embodiment shown in FIG. 4 are designated by like reference characters. This embodiment differs in that the antenna elements are made an array antenna 51j for beam forming and that the antenna assigning and weight-control unit 51b in FIG. 4 is replaced by a receive processor 51k, a feedback information extraction unit 51m and an amplitude and phase controller 51n.

The principle of closed-loop transmit beam forming is the same as that of closed-loop transmit diversity. In general, with transmit diversity, antenna spacing is made larger than ten wavelengths so that the antennas will be non-correlated. In the case of beam forming, on the other hand, antenna spacing is set to 0.5 to 1.0 wavelength and weights are adjusted in such a manner that beam directivity will be formed in the direction of the mobile station.

Figure 12:
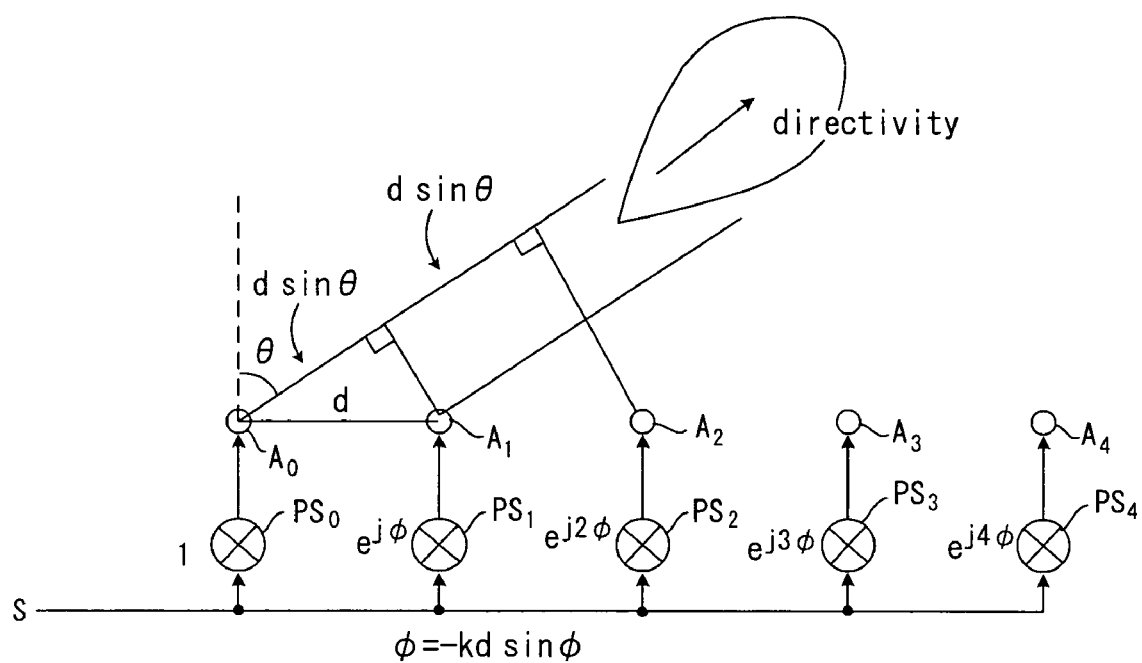
FIG. 12 is a diagram useful in describing an equally spaced linear array antenna.
Figure 13:
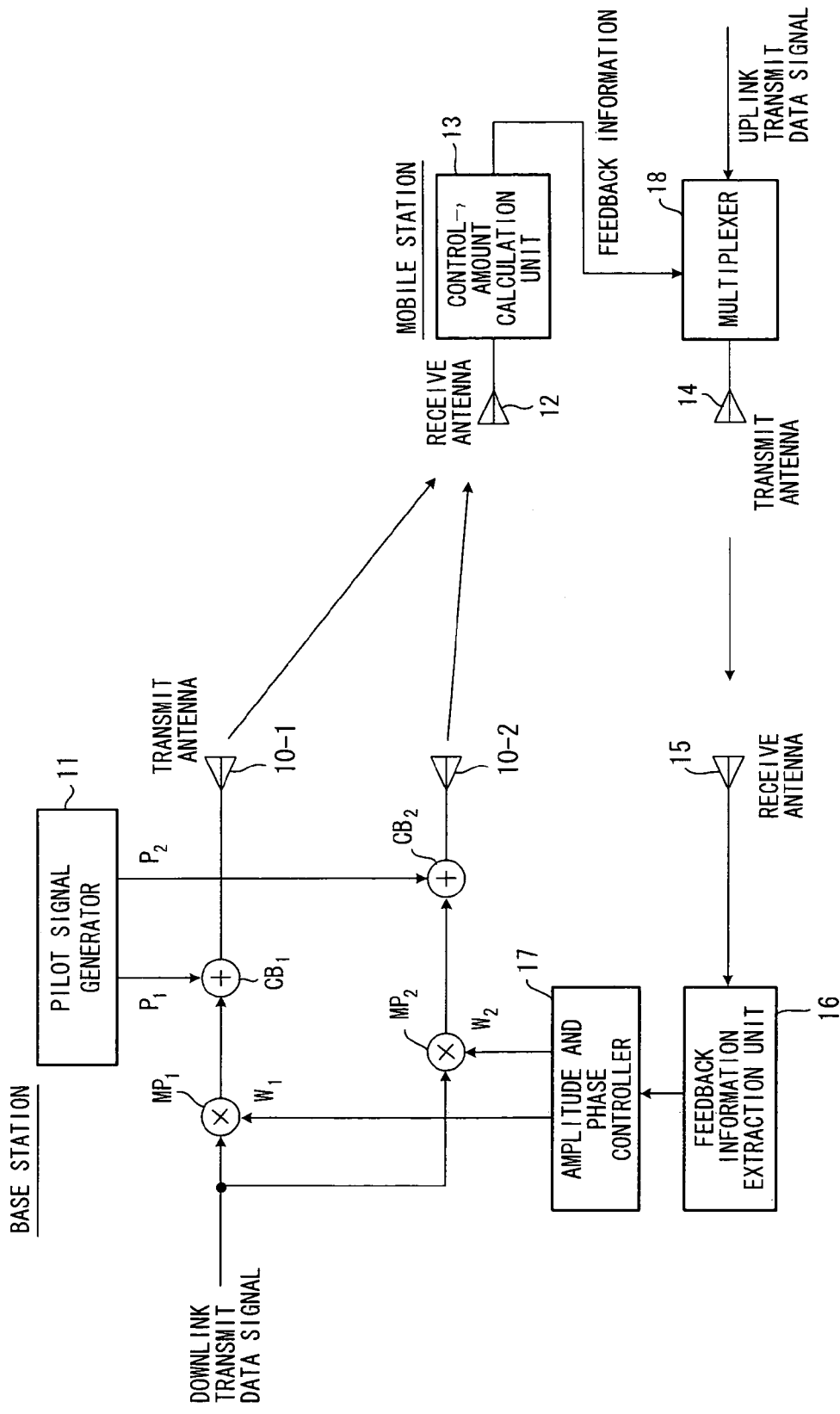
FIG. 13 is a diagram illustrating a conventional system configuration in a case where two transmit antennas are used.
Figure 14:
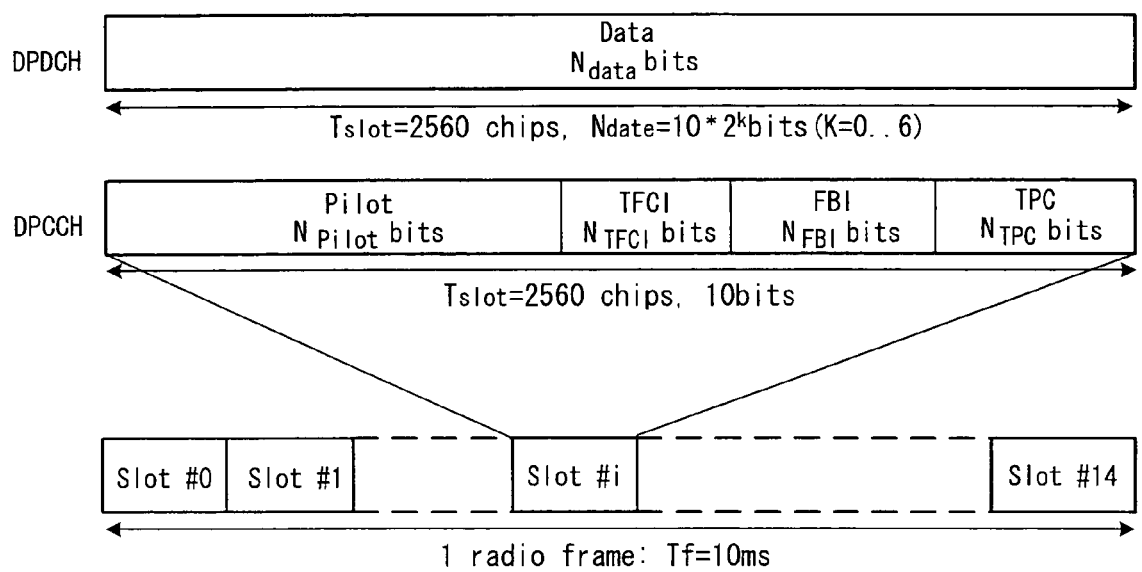
FIG. 14 is a diagram showing the structure of an uplink frame.
Figure 15:
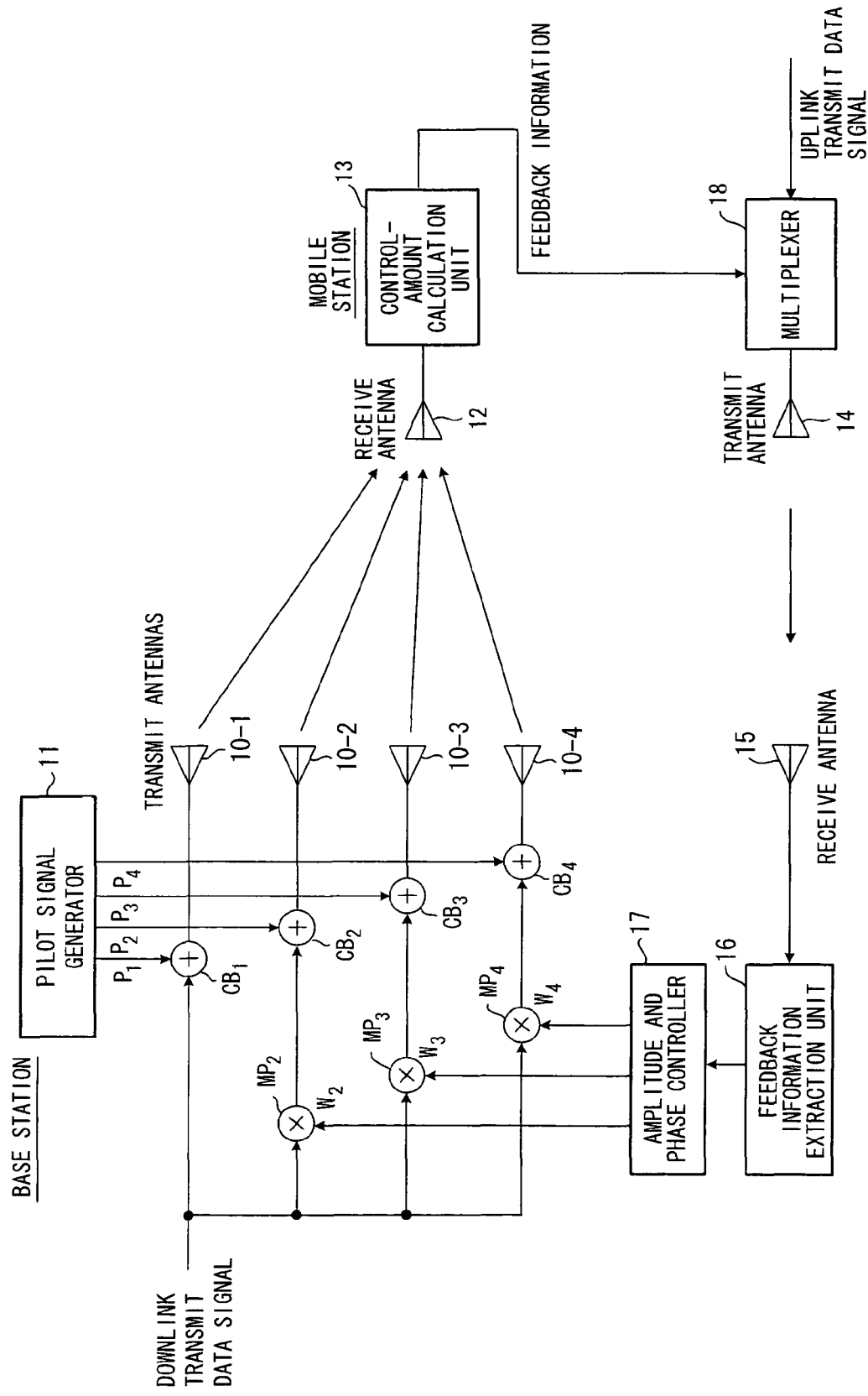
FIG. 15 is a diagram illustrating an example of the configuration of a transmit diversity system in a case where the number of transmit antennas is four.
Figure 16:
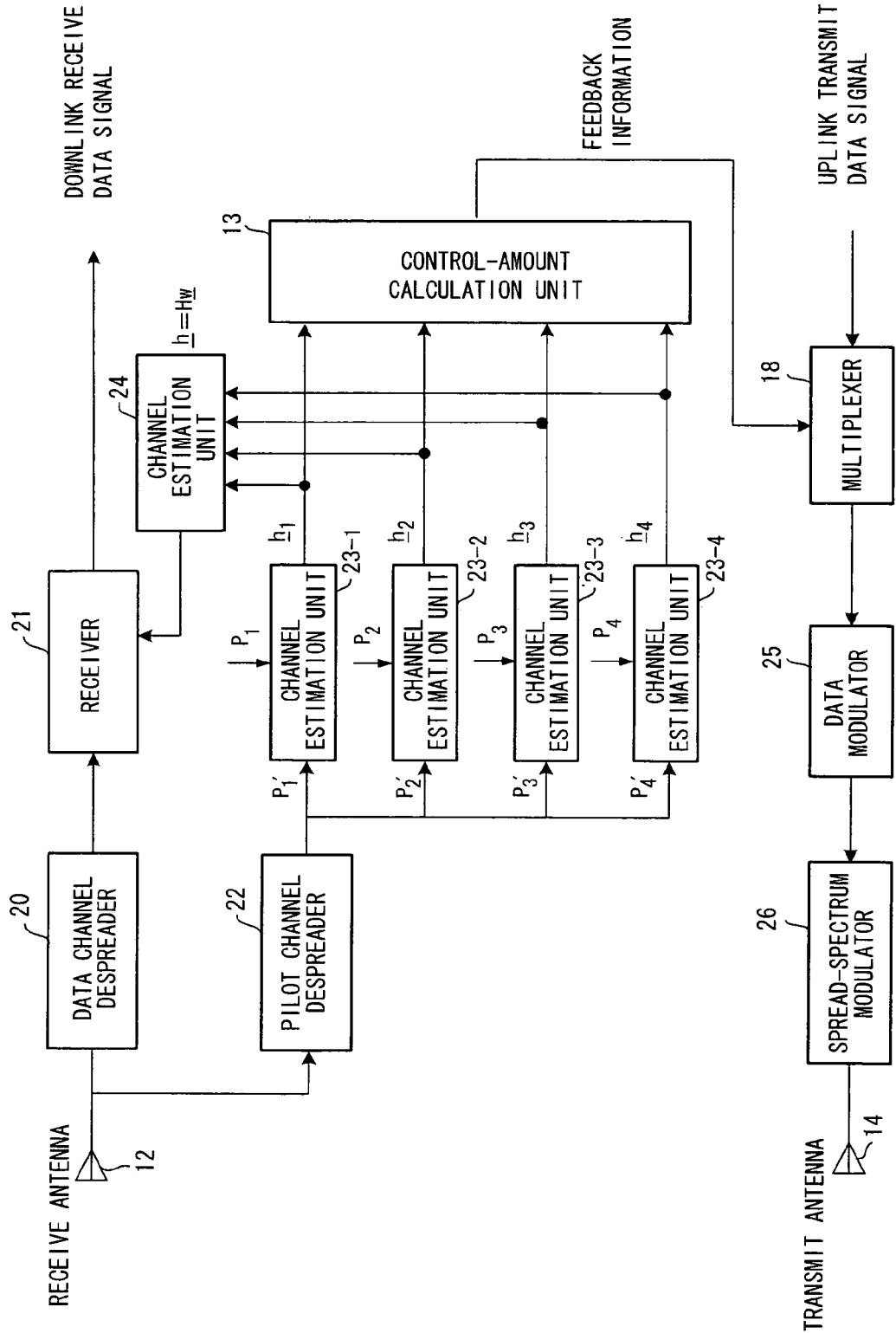
FIG. 16 is an example of the structural detail of a mobile station.
Figure 17:
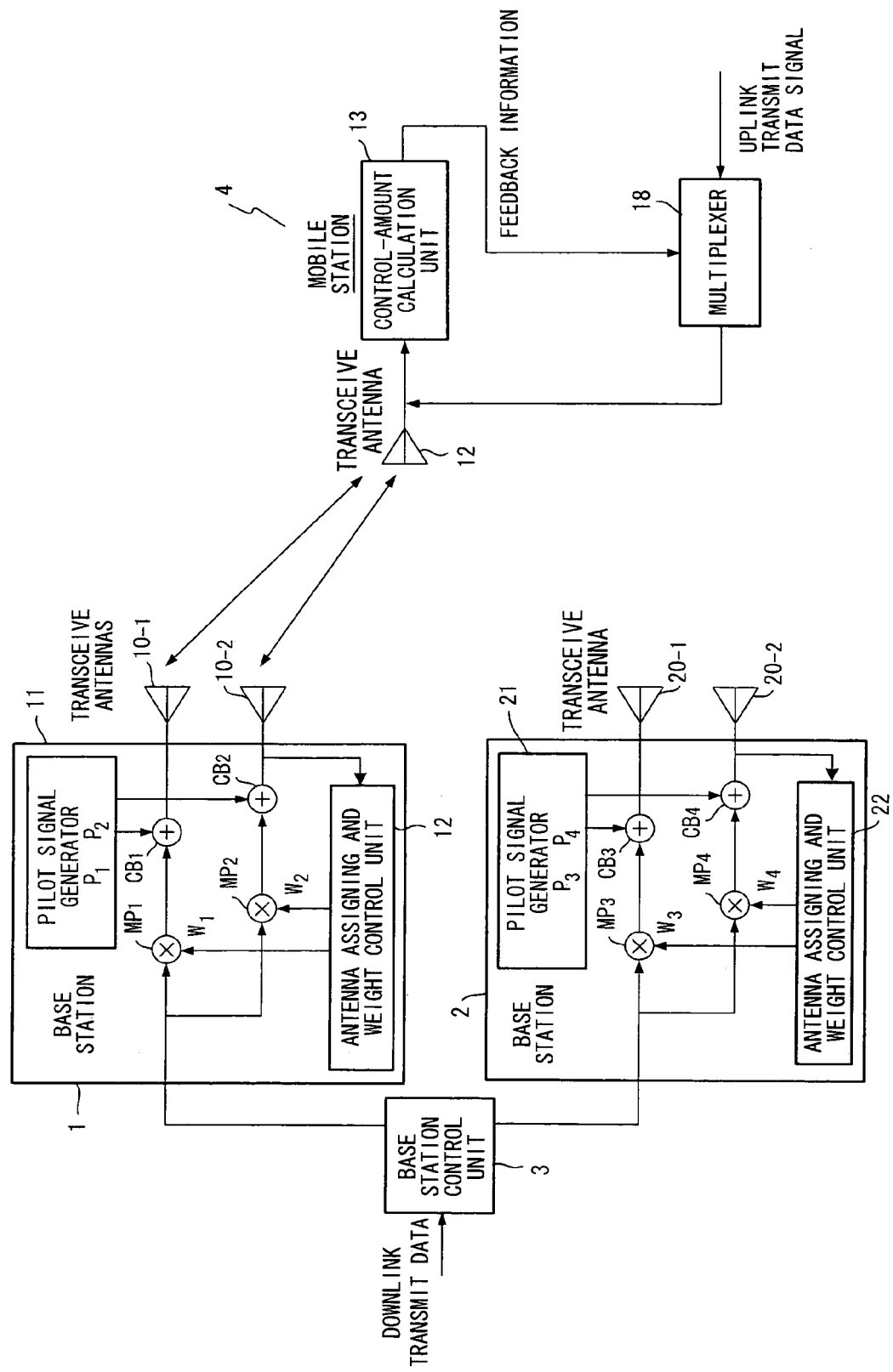
FIG. 17 is a diagram illustrating a conventional system configuration in a case where handover is performed.

In FIG. 11, the receive processor 51k subjects the uplink channel signal to receive processing, the feedback information extraction unit 51m extracts the feedback information (weights $w_1$ to $w_4$) sent from the mobile station 54, and the amplitude and phase controller 51n controls the multipliers $MP_1$ to $MP_4$ based upon the feedback information to thereby control the amplitude and phase of the transmit data signal that is input to each of the antenna elements. The array antenna 51j can be constructed from an equally spaced linear array antenna. The equally spaced linear array antenna is an array antenna in which antenna elements $A_0$ to $A_m$ (m=4) are arrayed linearly at a spacing d, as illustrated in FIG. 12. Phase shifters $PS_0$ to $PS_m$ (m=4) apply a phase difference of $\phi=-kd \sin\theta$ (where $k=2\pi/\lambda$ holds) successively to an input signal S and produce directivity in the direction of $\theta$ when current is fed to the antenna elements $A_0$ to $A_m$. It should be noted that since the radio-wave paths of the antenna elements #1 to #4 of array antenna 51j are the same, a pilot may be transmitted solely from the first antenna element #4.

In case of beam forming, it will suffice if the weights ($w_1$ to $w_4$) follow up a change in angular direction that accompanies movement of the mobile station 54. In comparison with transmit diversity, therefore, a low weight update speed is permissible. In closed-loop beam forming, therefore, the general practice is to set a long optimum-weight measurement time. Further, since the influence of feedback delay is small, the number of array antennas can be increased and all antenna weights can be fed back over a long slot. On the other hand, a long delay time is required until beam forming functions fully following changeover of the base station by handover, and transmit-diversity gain cannot be obtained during this delay time.

Accordingly, in the third embodiment, feedback information (weight) is calculated in advance of changeover of the base station by handover and is reported to the handover-destination base station, whereby beam forming is started without delay. It should be noted that weights are transmitted to the changeover-destination base station in advance of changeover by handover, taking into account feedback-control delay time even in closed-loop transmit beam forming of the third embodiment.

(E) Modification

Transmit diversity includes ① a method of controlling phase and amplitude and ② a method of controlling phase only. The foregoing embodiments are examples in which the present invention is applied to case ①. However, the present invention can also be applied to case ②. Specifically, the embodiments can be modified in such a manner that "feedback information representing a phase control amount is transmitted from a mobile station to a radio base station and phase control is applied to a transmit data signal based upon this feedback information in the base station," and the present invention can be applied to transmit diversity for controlling phase only.

(F) Summary

Changeover of a base station by handover is reported from the base station to a mobile station as higher-layer control information. However, the mobile station is capable of starting calculation of the antenna weights of the handover-destination base station immediately after it obtains information indicative of changeover of the base station by handover. Alternatively, the mobile station is capable of calculating optimum antenna weights of each base station beforehand using the pilot signals of the base station having the highest receive power among the handover candidates. Depending upon the system, the mode adopted may also be one in which a base station handed over by the base station controller is decided from among handover candidates of which the mobile station has been notified and this base station is reported to the base station and mobile station.

At the time of soft handover, weights that will maximize the power P indicated by Equation (4) are calculated using pilot signals from a plurality of base stations. The weights calculated are common to each of the base-station antennas. Movement of the mobile station is accompanied by changing active base stations in soft handover. Accordingly, before a base station is actually changed over, the antenna weights are calculated using the pilot signals of the new active base station, thereby making it possible to solve the problem of shortening of the measurement interval immediately after changeover. Further, by changing over the feedback information to the weights of the new active base station sooner by a length of time equivalent to feedback delay, delay up to the start of transmit diversity is eliminated and degradation of characteristics can be reduced.

In a closed-loop transmit beam forming system, feedback information (weight) is calculated in advance of base-station changeover by handover and the feedback information is reported to the handover-destination base station, thereby enabling beam forming to be started without delay.

In accordance with a high-speed cell selection scheme in soft handover, weights of each base station are calculated at all times and therefore the calculated weights can be transmitted at the same time that base-station changeover is commanded. It is possible to simultaneously execute the original communication control by the changeover-destination base station and transmit-diversity control.

Thus, in accordance with the present invention, it is possible to avoid shortening of the antenna-weight measurement interval immediately after a base station is changed over by handover. Further, antenna control in transmit diversity can be started immediately after handover. Moreover, a satisfactory transmit-diversity gain can be acquired immediately after handover. Furthermore, similar effects can be obtained even in a system that exhibits a large feedback delay, as is the case with transmit-beam forming, and in a system in which changeover is performed frequently, as in high-speed cell selection.

What is claimed is:

1. A feedback control method in closed-loop transmit diversity in which feedback information representing at least an amount of phase control is transmitted from a mobile station to a radio base station, comprising:
   receiving downlink pilot signals, which are transmitted by a handover-destination base station, during handover control;
   calculating feedback information, which represents an amount of phase control transmitted to said handover-destination base station, beforehand based upon the pilot signals received during handover control;
   transmitting said feedback information to the handover-destination base station before completion of base-station changeover by handover; and
   after completion of the base-station changeover by handover, immediately subjecting a downlink transmit data signal to phase control at said handover-destination base station using said feedback information.

2. A feedback control method according to claim 1, further comprising:
   providing the radio base station with a plurality of antenna elements;
   at said base station, subjecting the same transmit data signal to different phase control based upon the feedback information from the mobile station;
   multiplexing each of pilot signals onto respective one of the transmit data signals that have been subjected to said different phase control and transmitting each of the resultant signals using respective one of the antennas; and
   on the side of the mobile station, calculating the feedback information using downlink pilot signals, multiplexing said feedback information onto an uplink channel signal and transmitting the resultant signal to the side of the base station before completion of base-station changeover by handover.

3. A feedback control method in closed-loop transmit diversity according to claim 1, wherein the feedback information is transmitted to the handover-destination base station in advance of completion of base-station changeover by handover, taking feedback-control delay time into consideration.

4. A feedback control method in closed-loop transmit diversity according to claim 2, wherein each antenna element of the base station is constituted by an antenna array for beam forming.

5. A feedback control method in closed-loop transmit diversity in which feedback information representing at least an amount of phase control is transmitted from a mobile station to a radio base station, comprising:
   receiving each of downlink pilot signals, which are transmitted by a plurality of base stations, during soft handover control;
   calculating feedback information, which represents an amount of phase control transmitted to each base station, based upon each of the pilot signals received during soft handover control;
   transmitting said feedback information to a handover-destination base station before completion of base-station changeover by soft handover; and
   after completion of the base-station changeover by handover, immediately subjecting a downlink transmit data signal to phase control at said handover-destination base station using said feedback information.

6. A feedback control method according to claim 5, further comprising:
   providing each of the radio base stations with a plurality of antenna elements;
   at each base station, subjecting an identical transmit data signal to different phase control based upon the feedback information from the mobile station;
   multiplexing each of pilot signals onto respective one of the transmit data signals that have been subjected to said different phase control and transmitting each of the resultant signals using respective one of the antennas; and
   on the side of the mobile station, calculating the feedback information using downlink pilot signals, multiplexing said feedback information onto an uplink channel signal and transmitting the resultant signal to the side of the base station before completion of base-station changeover by soft handover.

7. A feedback control method in closed-loop transmit diversity according to claim 5, wherein the feedback information is transmitted to the handover-destination base station in advance of completion of base-station changeover by soft handover, taking feedback-control delay time into consideration.

8. A feedback control method in closed-loop transmit diversity in which feedback information representing at least an amount of phase control is transmitted from a mobile station to a radio base station, comprising:

receiving each of downlink pilot signals, which are transmitted by a plurality of base stations, during soft handover control;

calculating feedback information, which represents an amount of phase control transmitted to each base station, based upon each of the pilot signals received, and calculating receive power from each base station based upon received pilot signals during soft handover control;

deciding that a base station exhibiting maximum receive power is a changeover-destination base station;

transmitting an ID of said changeover-destination base station and the feedback information, which is sent to said changeover-destination base station, to the base stations simultaneously;

after completion of the base-station changeover by soft handover, immediately subjecting a downlink transmit signal to phase control at said changeover-destination base station using said feedback information.

9. A feedback apparatus of a mobile station in closed-loop transmit diversity in which feedback information representing at least an amount of phase control is transmitted from a mobile station to a radio base station, said feedback apparatus comprising:

a receiver for receiving downlink pilot signals, which are transmitted by a handover-destination base station during handover control;

a control unit for controlling calculation of feedback information, which represents an amount of phase control transmitted to the handover-destination base station, beforehand based upon the pilot signals received, and controlling transmission of said feedback information to the handover-destination base station before completion of base station changeover by handover;

a control-amount calculation unit for calculating said feedback information beforehand based upon the pilot signals received; and a transmitter for transmitting said feedback information to the handover-destination base station before completion of base-station changeover by handover, wherein after completion of the base-station changeover by handover, said handover-destination base station immediately subjects a downlink transmit data signal to phase control using said feedback information.

10. A feedback apparatus of a mobile station in closed-loop transmit diversity in which feedback information representing at least an amount of phase control is transmitted from a mobile station to a radio base station, said feedback apparatus comprising:

a receiver for receiving each of downlink pilot signals, which are transmitted by a plurality of base stations, during soft handover control;

a control unit for controlling calculation of feedback information, which represents an amount of phase control transmitted to each base station, beforehand and controlling transmission of said feedback information to a handover-destination base station before completion of base station changeover by soft handover;

a control-amount calculation unit for calculating said feedback information, based upon each of the pilot signals received; and a transmitter for transmitting said feedback information to the handover-destination base station before completion of base-station changeover by soft handover, wherein after completion of the base-station changeover by soft handover, said handover-destination base station immediately subjects a downlink transmit data signal to phase control using said feedback information.

11. A feedback apparatus of a mobile station in closed-loop transmit diversity in which feedback information representing at least an amount of phase control is transmitted from a mobile station to a radio base station, said feedback apparatus comprising:

a receiver for receiving each of downlink pilot signals, which are transmitted by a plurality of base stations, during soft handover control;

a control-amount calculation unit for calculating feedback information, which represents an amount of phase control transmitted to each base station, based upon each of the pilot signals received;

a receive-power calculation unit for calculating receive power from each base station based upon received pilot signals;

a changeover-destination base station decision unit for deciding that a base station exhibiting maximum receive power is a changeover-destination base station;

a transmitter for transmitting an ID of said changeover-destination base station and the feedback information, which is sent to said changeover-destination base station, to the base stations simultaneously; and a control unit for controlling the control amount calculation unit to calculate said feedback information, which represents an amount of phase control transmitted to each base station, beforehand and controlling the transmitter to transmit said ID of said changeover-destination base station and the feedback information, which is sent to said changeover-destination base station, to the base stations simultaneously, wherein after completion of the base-station changeover by soft handover, said changeover-destination base station immediately subjects a downlink transmit data signal to phase control using said feedback information.

* * * * *